United States Patent
Yoshita

(10) Patent No.: US 11,097,911 B2
(45) Date of Patent: Aug. 24, 2021

(54) MEDIUM CONVEYANCE DEVICE

(71) Applicant: PFU LIMITED, Ishikawa (JP)

(72) Inventor: Shogo Yoshita, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 168 days.

(21) Appl. No.: 16/503,213

(22) Filed: Jul. 3, 2019

(65) Prior Publication Data
US 2019/0322478 A1     Oct. 24, 2019

Related U.S. Application Data

(63) Continuation of application No. PCT/JP2017/000817, filed on Jan. 12, 2017.

(51) Int. Cl.
*B65H 1/02* (2006.01)
*H04N 1/00* (2006.01)

(52) U.S. Cl.
CPC ...... *B65H 1/02* (2013.01); *B65H 2405/11162* (2013.01); *B65H 2405/11425* (2013.01); *B65H 2405/324* (2013.01); *B65H 2405/33* (2013.01); *H04N 1/00* (2013.01)

(58) Field of Classification Search
CPC .... B65H 2405/1144; B65H 2405/1142; B65H 2405/214; B65H 2405/11425; B65H 2405/11162; B65H 2405/324; B65H 1/02
See application file for complete search history.

(56) References Cited

U.S. PATENT DOCUMENTS

| 7,722,033 | B2* | 5/2010 | Matsumoto | B65H 1/02 271/162 |
| 8,699,101 | B2* | 4/2014 | Mukai | H04N 1/00989 358/498 |
| 9,254,972 | B2* | 2/2016 | Ukai | B65H 1/04 |
| 2007/0001382 | A1 | 1/2007 | Matsumoto et al. | |

(Continued)

FOREIGN PATENT DOCUMENTS

| JP | H11-139629 A | 5/1999 |
| JP | 2000-128362 A | 5/2000 |
| JP | 2006-062863 A | 3/2006 |

(Continued)

OTHER PUBLICATIONS

International Search Report issued in corresponding International Patent Application No. PCT/JP2017/000817, dated Feb. 21, 2017.

*Primary Examiner* — Jeremy R Severson
(74) *Attorney, Agent, or Firm* — McDermott Will & Emery LLP

(57) ABSTRACT

A medium conveyance device includes a body, a table in which a placement surface is formed and that is supported by the body movably to be arranged in a first area or a second area, a guide that is supported by the table movably to be arranged in a third area or a fourth area and that regulates move of an original that is placed on the table such that a height of the guide is lower when the guide is arranged in the fourth area than when the guide is arranged in the third area, and a mechanism that moves the guide along with move of the table such that the guide is arranged in the third area when the table is arranged in the first area and the guide is arranged in the fourth area when the table is arranged in the second area.

5 Claims, 24 Drawing Sheets

(56) References Cited

U.S. PATENT DOCUMENTS

2013/0057932 A1 3/2013 Mukai
2015/0097329 A1 4/2015 Ukai

FOREIGN PATENT DOCUMENTS

| JP | 2007-008651 A | 1/2007 |
| JP | 2013-058852 A | 3/2013 |
| JP | 2015-074516 A | 4/2015 |

* cited by examiner

MEDIUM CONVEYANCE DEVICE

CROSS-REFERENCE TO RELATED APPLICATION

This application is a continuation of International Application No. PCT/JP2017/000817, filed on Jan. 12, 2017, the entire contents of which are incorporated herein by reference.

FIELD

The disclosed technology relates to a medium conveyance device.

BACKGROUND

Image read devices that read an image of an original are known. In an image read device, a table on which originals are placed is provided and a side guide that prevents the originals from being fed obliquely is provided on the table. The table is supported to be openable and closable, and closing the table saves the space in which the image read device is set and improves the appearance. A side guide whose posture is controlled along with opening and closing the table is known (see Japanese Laid-open Patent Publication No. 2007-8651).

Such a side guide however has a problem in that the side guide is formed to protrude from the placement surface of the table and thus the side guide contacts the body of the image read device when the table is closed and accordingly damages the body of the image read device and mars the appearance of the image read device.

SUMMARY

According to an aspect of an embodiment, a medium conveyance device includes a body, a table in which a placement surface is formed and that is supported by the body movably to be arranged in a first area where the placement surface is oriented upward or to be arranged in a second area where the placement surface is opposed to the body, a guide that is supported by the table movably to be arranged in a third area or a fourth area and that regulates move of an original that is placed on the placement surface such that a height of the guide with respect to the placement surface is lower when the guide is arranged in the fourth area than when the guide is arranged in the third area, and a mechanism that causes the guide to move along with move of the table such that the guide is arranged in the third area when the table is arranged in the first area and the guide is arranged in the fourth area when the table is arranged in the second area.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Preferred embodiments of the disclosure will be explained with reference to accompanying drawings. With reference to the accompanying drawings, medium conveyance devices according to embodiments disclosed herein will be described below. The following description does not limit the disclosure. In the following descriptions, the same components are denoted with the same reference numbers and redundant description will be omitted.

First Embodiment

Figure 1:
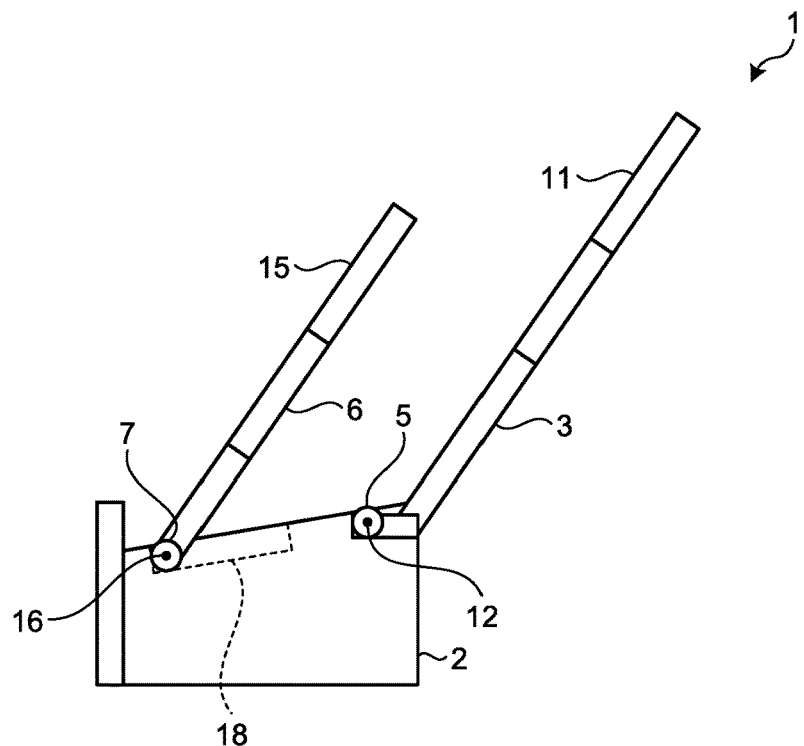
FIG. 1 is a side view of a medium conveyance device of a first embodiment.

FIG. 1 is a side view of a medium conveyance device 1 of a first embodiment. The medium conveyance device 1 is used as an image read device and, as illustrated in FIG. 1, includes a casing 2, a shooter 3, a shooter supporter 5, a stacker 6, and a stacker supporter 7. The casing 2 is formed to have a box shape and forms an outer shell of the body of the medium conveyance device 1. The casing 2 is placed on a setting surface on which the medium conveyance device 1 is set. The shooter 3 is formed into a platy shape and a shooter placement surface 11 that is approximately flat is formed in the shooter 3. The shooter 3 is arranged on a top part of the casing 2 on the back side (the right side in FIG. 1) such that, when the surface on which the medium conveyance device 1 is set is horizontal, the shooter placement surface 11 is oriented obliquely upward and the angle formed by the shooter placement surface 11 and the surface on which the medium conveyance device 1 is set is equal to 55 degrees. The shooter supporter 5 supports the shooter 3 such that the shooter 3 is able to turn about a rotation axis 12 with respect to the casing 2. The rotation axis 12 is parallel with the surface on which the medium conveyance device 1 is set and is parallel with the shooter placement surface 11. The shooter supporter 5 further inhibits the shooter 3 from turning such that the angle formed by the shooter placement surface 11 and the surface on which the medium conveyance device 1 is set is not smaller than 55 degrees. In other words, the shooter supporter 5 supports the shooter 3 such that the shooter 3 does not turn clockwise about the rotation axis 12 from the state illustrated in FIG. 1 because of the force of gravity.

The stacker 6 is formed into a platy shape, and a stacker placement surface 15 that is approximately flat is formed in the stacker 6. The stacker 6 is arranged on an upper part of the casing 2 on the front side (the left side in FIG. 1) such that the stacker placement surface 15 is approximately parallel with the shooter placement surface 11. In other words, the stacker 6 is arranged such that the stacker placement surface 15 is oriented obliquely upward and the angle formed by the stacker placement surface 15 and the surface on which the medium conveyance device 1 is set is equal to 55 degrees. The stacker 6 is arranged as described above and thus covers part of the shooter placement surface 11. The stacker supporter 7 supports the stacker 6 such that the stacker 6 is able to turn about a rotation axis 16 with respect to the casing 2. The rotation axis 16 is parallel with the rotation axis 12 and, in other words, is parallel with the surface on which the medium conveyance device 1 is set and is parallel with the stacker placement surface 15. The stacker supporter 7 further inhibits the stacker 6 from turning such that the angle formed by the stacker placement surface 15 and the surface on which the medium conveyance device 1 is set is not larger than 55 degrees. In other words, the stacker supporter 7 supports the stacker 6 such that the stacker 6 does not turn counterclockwise about the rotation axis 16 from the state illustrated in FIG. 1.

In the medium conveyance device 1, a stacker storage area 18 is formed. The stacker storage area 18 is formed between the shooter 3 and the stacker 6 in the upper part of the casing 2. In other words, the stacker storage area 18 is arranged on the back side of the upper part of the casing 2 with respect to the rotation axis 16 of the stacker 6 and is arranged on the front side of the upper part of the casing 2 with respect to the rotation axis 12 of the shooter 3.

Figure 2:
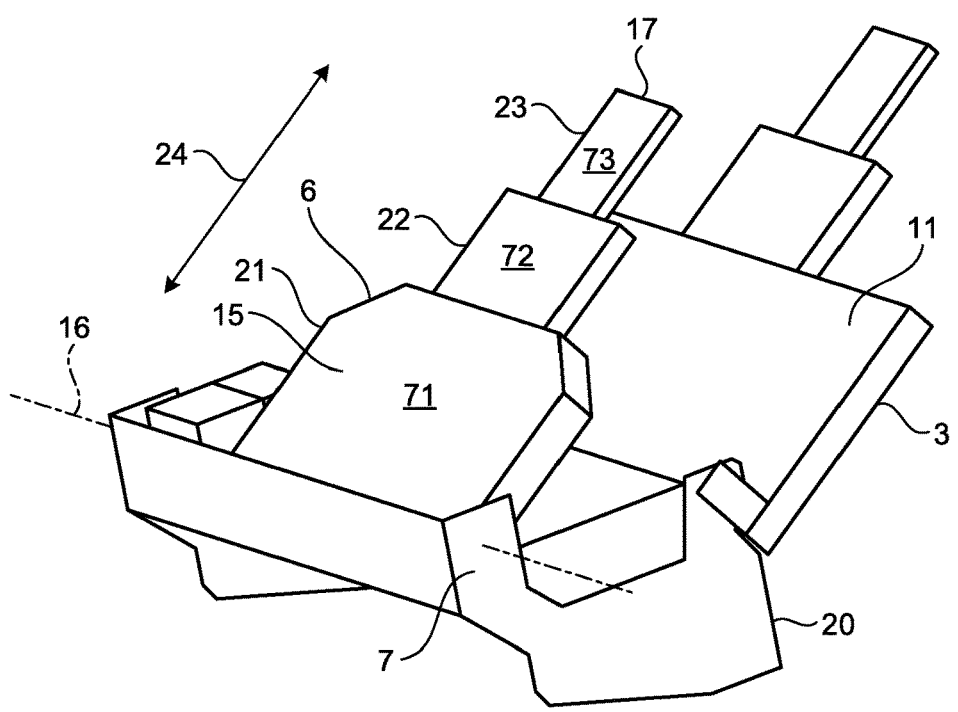
FIG. 2 is a perspective view of a shooter and a stacker.

FIG. 2 is a perspective view of the shooter 3 and the stacker 6. As illustrated in FIG. 2, the medium conveyance device 1 further includes a frame 20. The frame 20 is fixed to the body of the medium conveyance device 1 and, specifically, is arranged in the casing 2 and is fixed to to the casing 2. The stacker 6 includes a first stacker member 21, a second stacker member 22, and a third stacker member 23. The first stacker member 21 is formed into a platy shape and a first stacker placement surface 71 that is part of the stacker placement surface 15 is formed in the first stacker member 21. The first stacker member 21 is supported by the stacker supporter 7 and on the frame 20 such that the first stacker member 21 is able to turn about the rotation axis 16.

The second stacker member 22 is formed into a platy shape that is thinner than the first stacker member 21 and a second stacker placement surface 72 that is part of the stacker placement surface 15 is formed in the second stacker member 22. The second stacker member 22 is supported on the first stacker member 21 movably in parallel with an extension direction 24 to be arranged in an extension position or a contraction position. The extension direction 24 is orthogonal to the rotation axis 16 and is parallel with the stacker placement surface 15. The second stacker member 22 is pulled out of the first stacker member 21 and accordingly is arranged in the extension position and the second stacker member 22 is pushed into the first stacker member 21 and accordingly is arranged in the contraction position. The second stacker member 22 is arranged in the contraction position and accordingly the second stacker placement surface 72 overlaps the first stacker placement surface 71, and the second stacker member 22 is arranged in the extension position and accordingly the second stacker placement surface 72 is aligned with the first stacker placement surface 71.

The third stacker member 23 is formed into a platy shape thinner than the second stacker member 22, and a third stacker placement surface 73 that is part of the stacker placement surface 15 is formed in the third stacker member 23. The third stacker member 23 is supported on the second stacker member 22 movably in parallel with the extension direction 24 to be arranged in an extension position or a contraction position. The third stacker member 23 is pulled out of the second stacker member 22 and accordingly is arranged in the extension position and the third stacker member 23 is pushed into the second stacker member 22 and thus is arranged in the contraction position. The third stacker member 23 is arranged in the contraction position and accordingly the third stacker placement surface 73 overlaps the second stacker placement surface 72, and the third stacker member 23 is arranged in the extension position and accordingly the third stacker placement surface 73 is aligned with the second stacker placement surface 72. The stacker 6 is formed in this manner and thus is formed to contract such that a stacker end 17 on the distal side with respect to the rotation axis 16 is close to the rotation axis 16 or to extend such that the stacker end 17 is away from the rotation axis 16.

The stacker 6 further includes an interlock mechanism (not illustrated in FIG. 2). The interlock mechanism converts motion of the second stacker member 22 to be pulled out of the first stacker member 21 or pushed into the first stacker member 21 into motion of the third stacker member 23 to be pulled out of the second stacker member 22 or pushed into the second stacker member 22. In other words, the interlock mechanism mechanically converts motion of the second stacker member 22 to be pulled out of the first stacker member 21 into motion of the third stacker member 23 to be pulled out of the second stacker. The interlock mechanism further mechanically converts motion of the second stacker member 22 to be pushed into the first stacker member 21 into motion of the third stacker member 23 to be pushed into the second stacker member 22. The interlock mechanism enables the second stacker member 22 to be pulled out of the first stacker member 21 and pushed into the first stacker member 21 and thus the stacker 6 extends and contracts.

Figure 3:
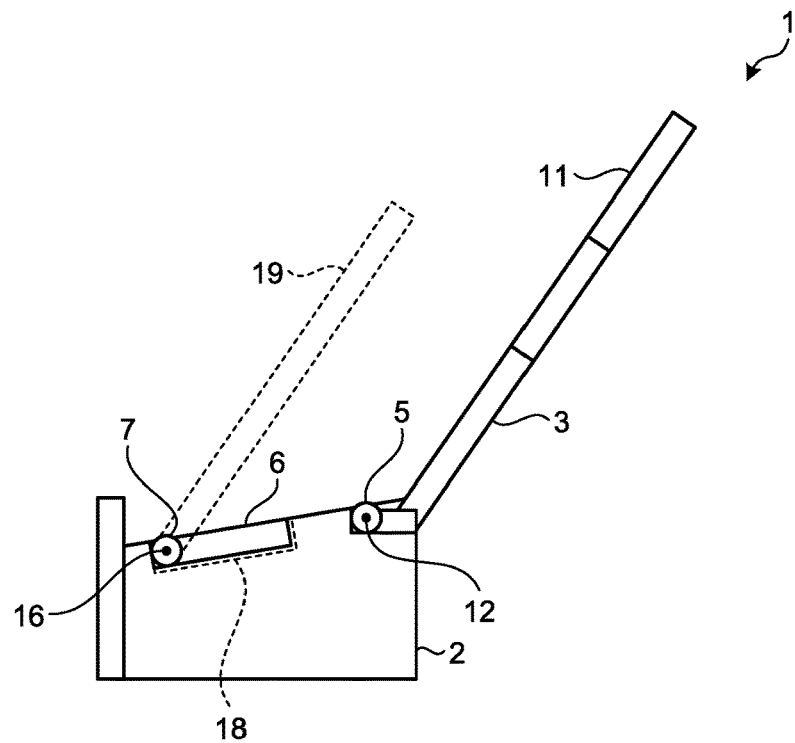
FIG. 3 is a side view of the medium conveyance device in the case where the stacker is stored.

FIG. 3 is a side view of the medium conveyance device 1 in the case where the stacker 6 is housed in the stacker storage area 18. As illustrated in FIG. 3, turning the stacker 6 about the rotation axis 16 when the stacker 6 is caused to contract causes the stacker 6 to be arranged in the stacker storage area 18 and stored. In other words, the stacker supporter 7 supports the stacker 6 movably such that the stacker 6 is arranged in the stacker storage area 18 or a stacker development area 19. The stacker development area 19 is an area where the stacker 6 is arranged in FIG. 6. In other words, the stacker 6 is arranged in the stacker development area 19 and accordingly the stacker placement surface 15 is oriented obliquely upward and the angle formed by the surface on which the medium conveyance device 1 is set is approximately equal to 55 degrees.

The stacker 6 is arranged in the stacker storage area 18 and accordingly the shooter placement surface 11 is exposed and, compared to the case where the stacker 6 is arranged in the stacker development area 19, it is possible to reduce the area covered with the stacker 6 in the shooter placement surface 11. In other words, the area of a diagram obtained by orthogonally projecting the stacker 6 that is arranged in the stacker storage area 18 onto the shooter placement surface 11 is smaller than the area of a diagram obtained by orthogonally projecting the stacker 6 that is arranged in the stacker development area 19 onto the shooter placement surface 11.

Figure 4:
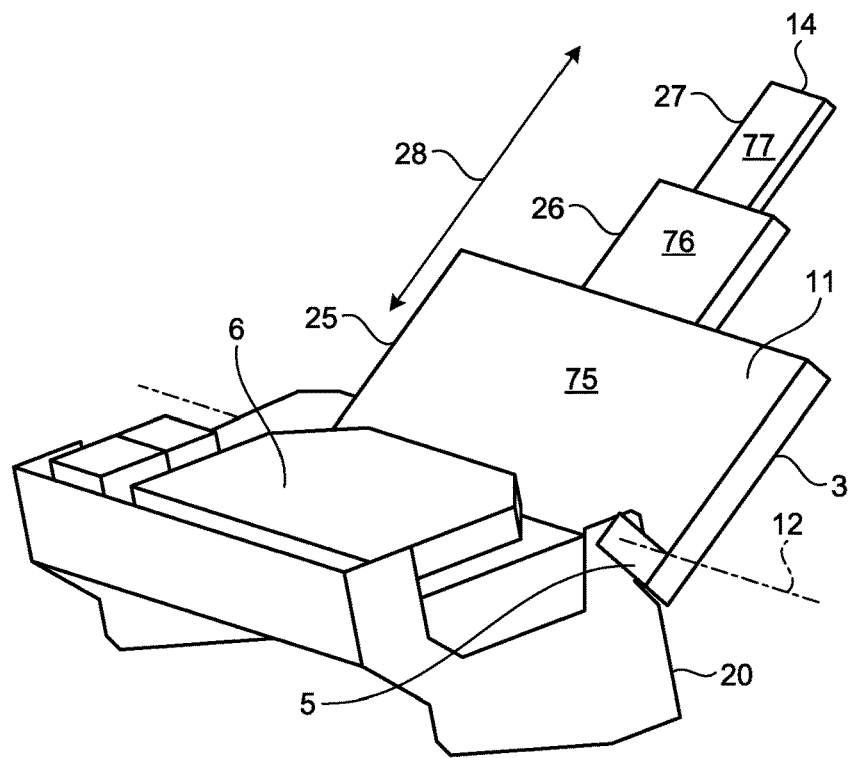
FIG. 4 is a perspective view of the stacker and the shooter in the case where the stacker is stored.

FIG. 4 is a perspective view of the stacker 6 and the shooter 3 in the case where the stacker 6 is stored in the stacker storage area 18. As illustrated in FIG. 4, the shooter 3 includes a first shooter member 25, a second shooter member 26, and a third shooter member 27. The first shooter member 25 is formed into a platy shape and a first shooter placement surface 75 that is part of the shooter placement surface 11 is formed in the first shooter member 25. The first shooter member 25 is supported by the shooter supporter 5 and on the frame 20 to be able to turn about the rotation axis 12 to be arranged in a shooter development position or a shooter storage position. The first shooter member 25 is arranged in the shooter development position when the shooter placement surface 11 is oriented obliquely upward.

The second shooter member 26 is formed into a platy shape thinner than the first shooter member 25, and a second shooter placement surface 76 that is part of the shooter placement surface 11 is formed on the second shooter member 26. The second shooter member 26 is supported on the first shooter member 25 movably in parallel with an extension-contraction direction 28 to be arranged in an extension position or a contraction position. The extension-contraction direction 28 is orthogonal to the rotation axis 12 and is parallel with the shooter placement surface 11. The second shooter member 26 is pulled out of the first shooter member 25 and accordingly is arranged in the extension position. The second shooter member 26 is pushed into the first shooter member 25 and accordingly is arranged in the contraction position. The second shooter placement surface 76 is arranged in the contraction position and accordingly overlaps the first shooter placement surface 75, and the second shooter placement surface 76 is arranged in the extension position and accordingly is aligned with the first shooter placement surface 75.

The third shooter member 27 is formed into a platy shape thinner than the second shooter member 26, and a third shooter placement surface 77 that is part of the shooter placement surface 11 is formed in the third shooter member 27. The third shooter member 27 is supported on the second shooter member 26 movably in parallel with the extension-contraction direction 28 such that the third shooter member 27 is arranged in an extension position or a contraction position. The third shooter member 27 is pulled out of the second shooter member 26 and accordingly is arranged in the extension position. The third shooter member 27 is pushed into the second shooter member 26 and accordingly is arranged in the contraction position. The third shooter placement surface 77 is arranged in the contraction position and accordingly overlaps the second shooter placement surface 76, and the third shooter placement surface 77 is arranged in the extension position and accordingly is aligned with the second shooter placement surface 76. The shooter 3 is formed as described above and thus is formed to be contractible such that a shooter end 14 on the distal side with respect to the rotation axis 12 moves close to the rotation axis 12 and to be extensible such that the shooter end 14 moves away from the rotation axis 12.

Figure 5:
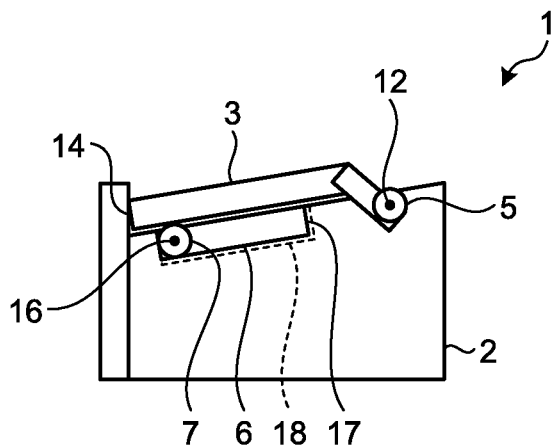
FIG. 5 is a side view of the medium conveyance device in the case where the shooter is stored.
Figure 6:
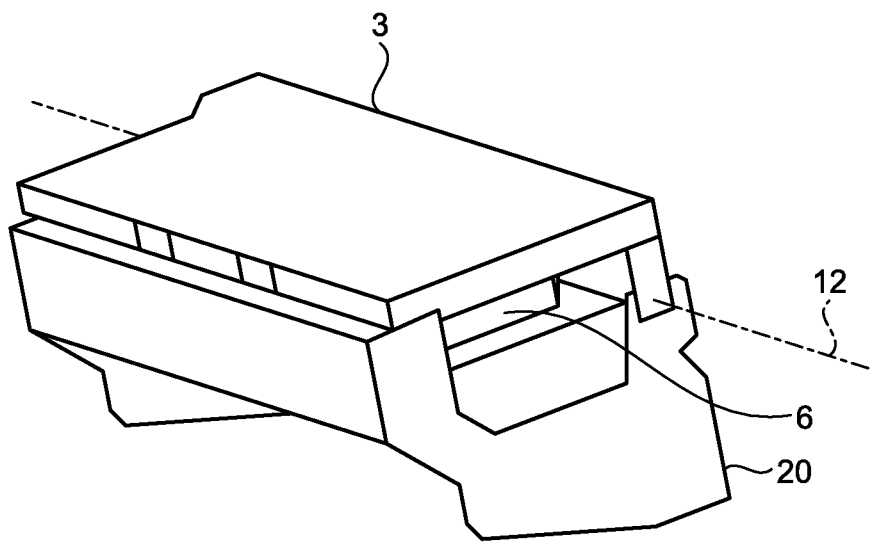
FIG. 6 is a perspective view of the stacker and the shooter in the case where the shooter is stored.

FIG. 5 is a side view of the medium conveyance device 1 in the case where the shooter 3 is stored. FIG. 6 is a perspective view of the stacker 6 and the shooter 3 in the case where the shooter 3 is stored. As illustrated in FIG. 5, when the shooter 3 contracts in the case where the stacker 6 is stored in the stacker storage area 18, the shooter 3 is storable in the upper part of the stacker 6. In other words, when the shooter 3 is stored, the third shooter member 27 is arranged in the contraction position and is pushed into the second shooter member 26. When the shooter 3 is stored, the second shooter member 26 is arranged in the contraction position and is pushed into the first shooter member 25. When the shooter 3 is stored, the first shooter member 25 is arranged in the shooter storage position and the first shooter placement surface 75 is opposed to the stacker 6. Storing the shooter 3 reduces the height and size of the medium conveyance device 1. Storing the shooter 3 further enables the stacker 6 to be covered as illustrated in FIG. 6.

Figure 7:
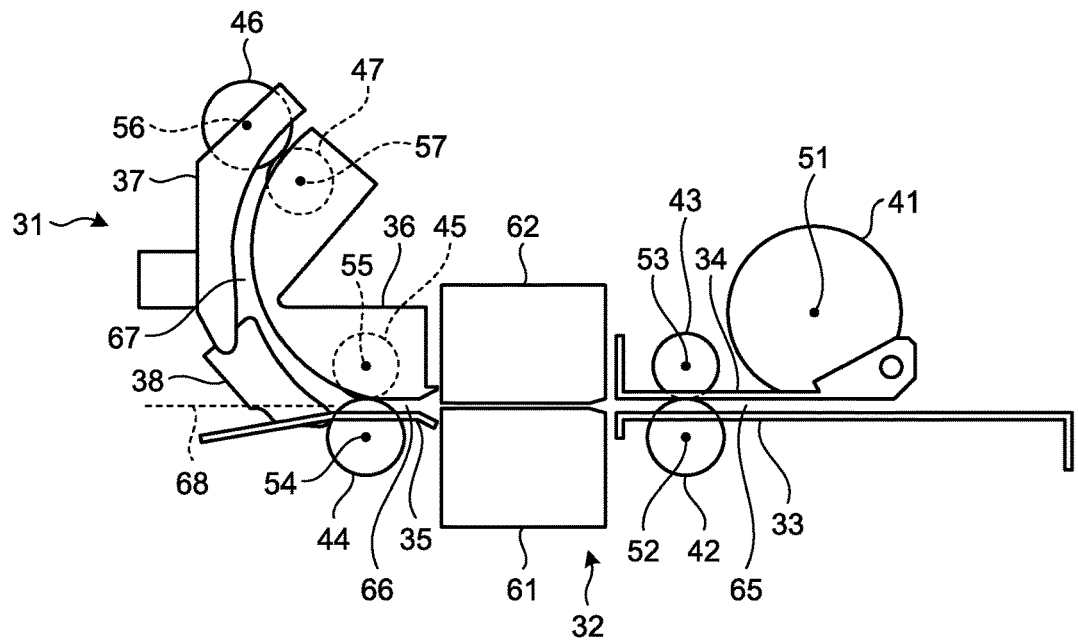
FIG. 7 is a cross-sectional view of the conveyance device and a read device.

FIG. 7 is a cross-sectional view of a conveyance device 31 and a read device 32. As illustrated in FIG. 7, the medium conveyance device 1 further includes the conveyance device 31 and the read device 32.

Conveyance Device

The conveyance device 31 is arranged in the casing 2. The conveyance device 31 includes a plurality of conveyance guides 33 to 37, a switch guide 38, and a plurality of conveyance rollers 41 to 47. The conveyance guides 33 to 37 include a first conveyance guide 33, a second conveyance guide 34, a third conveyance guide 35, a fourth conveyance guide 36, and a fifth conveyance guide 37. The first conveyance guide 33 is formed into a platy shape that is approximately flat. The first conveyance guide 33 is arranged along a plane that is approximately parallel with the surface on which the medium conveyance device 1 is set and the first conveyance guide 33 is fixed to the frame 20. The second conveyance guide 34 is formed into a platy shape that is approximately flat. The second conveyance guide 34 is arranged above the first conveyance guide 33 to be opposed to the first conveyance guide 33. The second conveyance guide 34 is further supported on the frame 20 such that the second conveyance guide 34 can lift up and down vertically.

The third conveyance guide 35 is formed into an approximately platy shape. The third conveyance guide 35 is arranged in front of the first conveyance guide 33 to be along the plane along which the first conveyance guide 33 is and is fixed to the frame 20. The fourth conveyance guide 36 is formed into a pillar shape and a convex surface along part of a side surface of a cylinder is formed in the fourth conveyance guide 36. The fourth conveyance guide 36 is arranged above the third conveyance guide 35 such that part of the convex surface is opposed to the third conveyance guide 35. The fourth conveyance guide 36 is fixed to the frame 20. The fifth conveyance guide 37 is formed into a pillar shape and a concave surface along part of the side surface of the cylinder is formed in the fifth conveyance guide 37. The fifth conveyance guide 37 is arranged in front of the fourth conveyance guide 36 such that its concave surface is opposed to part of the convex surface of the fourth conveyance guide 36.

The conveyance device 31 includes the conveyance guides 33 to 37 and thus a conveyance path 65, a conveyance path 66, a return conveyance path 67, and a straight conveyance path 68 are formed. The conveyance path 65 is formed between the first conveyance guide 33 and the second conveyance guide 34. The conveyance path 65 is formed to be along a plane that is parallel with the surface on which the medium conveyance device 1 is set. The conveyance path 65 is formed further to be connected to the shooter placement surface 11 when the shooter 3 is developed. The conveyance path 66 is formed between the third conveyance guide 35 and the fourth conveyance guide 36. The conveyance path 66 is formed to be along the plane along the conveyance path 65.

The return conveyance path 67 is formed between the fourth conveyance guide 36 and the fifth conveyance guide 37. The return conveyance path 67 is formed to be along the side surface of the cylinder. The return conveyance path 67 is formed further to be connected to the stacker placement surface 15 when the stacker 6 is arranged in the stacker development area 19. The straight conveyance path 68 is formed under the fifth conveyance guide 37. The straight conveyance path 68 is formed along the plane along which the conveyance path 65 is. The straight conveyance path 68 is formed further to be connected to the outside of the casing 2.

The switch guide 38 is formed to be in an approximately platy shape and is supported on the frame 20 movably to be arranged in a return path guide position or a straight path guide position. The switch guide 38 is arranged in the return path guide position to connect the conveyance path 66 to the return conveyance path 67. The switch guide 38 is arranged in the straight path guide position to connect the conveyance path 66 to the straight conveyance path 68.

The conveyance rollers 41 to 47 include a pick roller 41, a first drive roller 42, a first pinch roller 43, a second drive roller 44, a second pinch roller 45, a third drive roller 46, and a third pinch roller 47. The pick roller 41 is formed into a cylindrical shape and is arranged above the conveyance path 65. The pick roller 41 is supported on the frame 20 rotatably about a rotation axis 51. The rotation axis 51 is parallel with the rotation axis 12. Furthermore, the pick roller 41 is arranged to contact an original that is placed on the shooter placement surface 11 of the developed shooter 3. The pick roller 41 rotates normally (clockwise in FIG. 7) about the rotation axis 51 and accordingly one original that contacts the pick roller 41 among a plurality of originals placed on the shooter placement surface 11 is conveyed to the conveyance path 65.

The first drive roller 42 is formed into a cylindrical shape and is arranged under the conveyance path 65 and in front of the pick roller 41. The first drive roller 42 is supported on the frame 20 rotatably about a rotation axis 52. The rotation axis 52 is parallel with the rotation axis 51. The first pinch roller 43 is formed into a cylindrical shape and is arranged above the first drive roller 42. The first pinch roller 43 is supported on the frame 20 such that the first pinch roller 43 is rotatable on a rotation axis 53 and is liftable vertically. The rotation axis 53 is parallel with the rotation axis 52. The first drive roller 42 and the first pinch roller 43 are further arranged such that the original conveyed on the conveyance path 65 is interposed between the first drive roller 42 and the first pinch roller 43. The first drive roller 42 rotates normally (counterclockwise in FIG. 7) about the rotation axis 52 and the original that is conveyed on the conveyance path 65 is pushed by the first pinch roller 43 against the first drive roller 42 and accordingly is conveyed to the conveyance path 66. The original conveyed on the conveyance path 65 contacts the second conveyance guide 34 and accordingly the second conveyance guide 34 lifts up and down with respect to the frame 20 to be arranged at a level corresponding to the thickness of the original. In other words, the thicker the original conveyed on the conveyance path 65 is, the higher the level at which the second conveyance guide 34 is arranged is. The first pinch roller 43 lifts up and down to be arranged at a level corresponding to the thickness of the original conveyed on the conveyance path 65. In other words, the thicker the original conveyed on the conveyance path 65 is, the higher the level at which the first pinch roller 43 is arranged is.

The second drive roller 44 is formed into a cylindrical shape and is arranged under the conveyance path 66. The second drive roller 44 is supported on the frame 20 rotatably about a rotation axis 54. The rotation axis 54 is parallel with the rotation axis 51. The second pinch roller 45 is formed into a cylindrical shape and is arranged above the conveyance path 66. The second pinch roller 45 is supported on the frame 20 to be rotatable on a rotation axis 55 and liftable vertically. The rotation axis 55 is parallel with the rotation axis 54. The second drive roller 44 and the second pinch roller 45 are arranged further such that the original conveyed on the conveyance path 66 is interposed between the second drive roller 44 and the second pinch roller 45. The second drive roller 44 rotates normally (counterclockwise in FIG. 7) about the rotation axis 54 and the original conveyed on the conveyance path 66 is pushed by the second pinch roller 45 against the second drive roller 44 and accordingly is conveyed to the return conveyance path 67 or the straight conveyance path 68. The second pinch roller 45 lifts up and down to be arranged at a level corresponding to the thickness of the original conveyed on the conveyance path 66. In other words, the thicker the original conveyed on the conveyance path 66 is, the higher the level at which the second pinch roller 45 is arranged is.

The third drive roller 46 is formed into a cylindrical shape and is arranged in front of the return conveyance path 67. The third drive roller 46 is supported on the frame 20 rotatably about a rotation axis 56. The rotation axis 56 is parallel with the rotation axis 51. The third pinch roller 47 is formed into a cylindrical shape and is arranged behind the third drive roller 46. The third pinch roller 47 is supported on the frame 20 such that the third pinch roller 47 is rotatable on a rotation axis 57. The rotation axis 57 is parallel with the rotation axis 56. The third drive roller 46 and the third pinch roller 47 are further arranged such that the original conveyed on the return conveyance path 67 is interposed between the third drive roller 46 and the third pinch roller 47. The third drive roller 46 rotates normally (counterclockwise in FIG. 7) and the original conveyed on the return conveyance path 67 is pushed by the third pinch roller 47 against the third drive roller 46 and accordingly is placed on the stacker placement surface 15 of the stacker 6 in the stacker development area 19.

The conveyance device 31 is configured as described above to convey the original arranged at the top of the originals placed on the shooter 3 to the conveyance paths 65 and 66. The conveyance device 31 further conveys the original that is conveyed from the conveyance path 66 to the return conveyance path 67 to the stacker 6 and places the original on the stacker placement surface 15. The surface of the original that is opposed to the shooter placement surface 11 when being placed on the shooter 3 is the back surface of the surface opposed to the stacker placement surface 15 when the original is placed on the stacker placement surface 15 of the stacker 6. The conveyance device 31 further ejects the original conveyed from the conveyance path 66 to the straight conveyance path 68 to the outside of the casing 2.

Compared to the straight conveyance path 68, the degree of curve of the return conveyance path 67 is large. For this reason, the degree of deformation of the original passing through the return conveyance path 67 is larger than the degree of deformation of the original passing through the straight conveyance path 68.

The stacker 6 further includes another interlock mechanism (not illustrated in FIG. 7). When the pick roller 41, the first drive roller 42, the second drive roller 44, and the third drive roller 46 rotate normally, the interlock mechanism causes the first stacker member 21 to turn about the rotation axis 16 to be arranged in the stacker development area 19. The interlock mechanism holds the first stacker member 21 such that the first stacker member 21 is arranged in the stacker development area 19 during normal rotation of the pick roller 41, the first drive roller 42, the second drive roller 44, and the third drive roller 46. When the pick roller 41, the first drive roller 42, the second drive roller 44, and the third drive roller 46 rotate inversely, the interlock mechanism causes the first stacker member 21 to turn about the rotation axis 16 to be arranged in the stacker storage area 18.

Read Device

The read device 32 is arranged between the conveyance path 65 and the conveyance path 66 in the casing 2. The read device 32 includes a lower image sensor 61 and an upper image sensor 62. The lower image sensor 61 is arranged under the plane along whish the conveyance path 65 and the conveyance path 66 are and is fixed to the frame 20. The lower image sensor 61 is formed of an image sensor of a contact image sensor (CIS) type. The lower image sensor 61 contacts a lower read surface of the original conveyed from the conveyance path 65 to the conveyance path 66, illuminates the read surface, and receives the light reflected on the read surface, thereby reading the image on the read surface. The upper image sensor 62 is arranged above the plane surface along which the conveyance path 65 and the conveyance path 66 are and is supported on the frame 20 movably in parallel with the vertical direction. The upper image sensor 62 is formed of a CIS-type image sensor. The upper image sensor 62 illuminates an upper read surface of the original that is conveyed from the conveyance path 65 to the conveyance path 66 and receives the light reflected on the read surface, thereby reading the image on the read surface.

Figure 8:
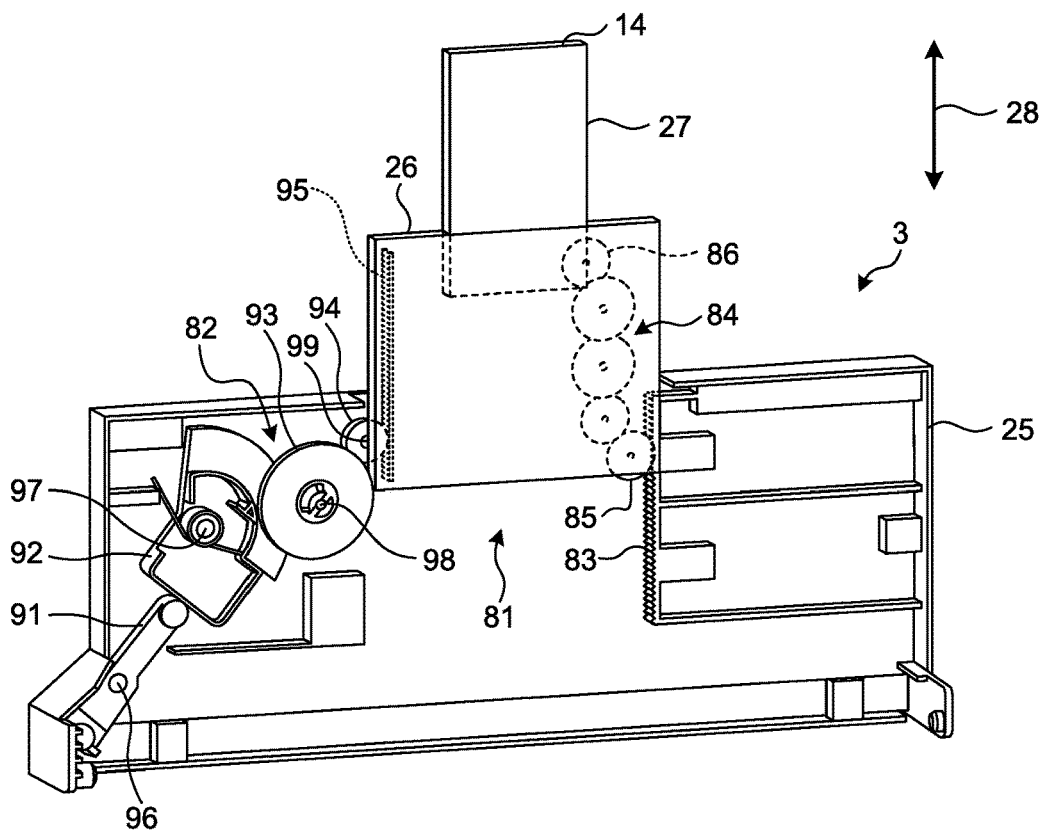
FIG. 8 is a cross-sectional perspective view of a first interlock mechanism and a second interlock mechanism.

FIG. 8 is a cross-sectional perspective view of a first interlock mechanism 81 and a second interlock mechanism 82. As illustrated in FIG. 8, the shooter 3 includes the first interlock mechanism 81 and the second interlock mechanism 82. The first interlock mechanism 81 includes a first rack 83, a plurality of gears 84, and a second rack (not illustrated in FIG. 8). The first rack 83 is arranged along a straight line parallel with the extension-contraction direction 28 and is fixed to the first shooter member 25. The second rack is arranged along a straight light parallel with the extension-contraction direction 28 and is fixed to the third shooter member 27.

Each of the gears 84 is formed into a shape of a disk with a circumference on which teeth are formed. The gears 84 are arranged such that the teeth are engaged with each other and the gears 84 are rotatably supported on the second shooter member 26. The teeth of the gears 84 are engaged with each other and thus, when one of the gears 84 rotates, all the gears 84 rotate. A gear 85 that is one of the gears 84 is engaged with the first rack 83. A gear 86 that is another one of the gears 84 is engaged with the second rack.

The first interlock mechanism 81 is formed as described above and thus mechanically converts motion of the second shooter member 26 to be pulled out of the first shooter member 25 to motion of the third shooter member 27 to be pulled out of the second shooter member 26. The first interlock mechanism 81 further mechanically converts motion of the second shooter member 26 to be pushed into the first shooter member 25 into motion of the third shooter member 27 to be pushed into the second shooter member 26. The first interlock mechanism 81 further mechanically converts motion of the third shooter member 27 to be pulled out of the second shooter member 26 into motion of the second shooter member 26 to be pulled out of the first shooter member 25. The first interlock mechanism 81 further mechanically converts motion of the third shooter member 27 to be pushed into the second shooter member 26 into motion of the second shooter member 26 to be pushed into the first shooter member 25.

The first interlock mechanism 81 is formed as described above to further arrange the third shooter member 27 in a position corresponding to the position in which the second shooter member 26 is arranged. For example, when the second shooter member 26 is arranged in the contraction position, the first interlock mechanism 81 arranges the third shooter member 27 in the contraction position. When the second shooter member 26 is arranged in the extension position, the first interlock mechanism 81 further arranges the second shooter member 26 in a position corresponding to the position in which the third shooter member 27 is arranged. For example, when the third shooter member 27 is arranged in the contraction position, the first interlock mechanism 81 arranges the second shooter member 26 in the contraction position. When the third shooter member 27 is arranged in the extension position, the first interlock mechanism 81 arranges the second shooter member 26 in the extension position.

The second interlock mechanism 82 includes a lever 91, a sector gear 92, a deceleration gear 93, and a rack 95. The lever 91 is formed into a bar shape. The lever 91 is supported on the first shooter member 25 rotatably about a rotation axis 96 to be arranged in a lever development position or a lever storage position. The rotation axis 96 is orthogonal to the shooter placement surface 11. The sector gear 92 is supported on the first shooter member 25 rotatably about a rotation axis 97 to be arranged in a sector gear development position or a sector gear storage position. The rotation axis 97 is orthogonal to the shooter placement surface 11. The deceleration gear 93 is supported on the first shooter member 25 rotatably about a rotation axis 98 to be arranged in a deceleration gear development position or a deceleration gear storage position. The rotation axis 98 is orthogonal to the shooter placement surface 11. A gear 94 is supported on the first shooter member 25 rotatably about a rotation axis 99 to be arranged in a gear development position or a gear storage position. The rotation axis 99 is orthogonal to the shooter placement surface 11. The rack 95 is arranged along a straight line parallel with the extension-contraction direction 28 and is fixed to the second shooter member 26.

Figure 9:
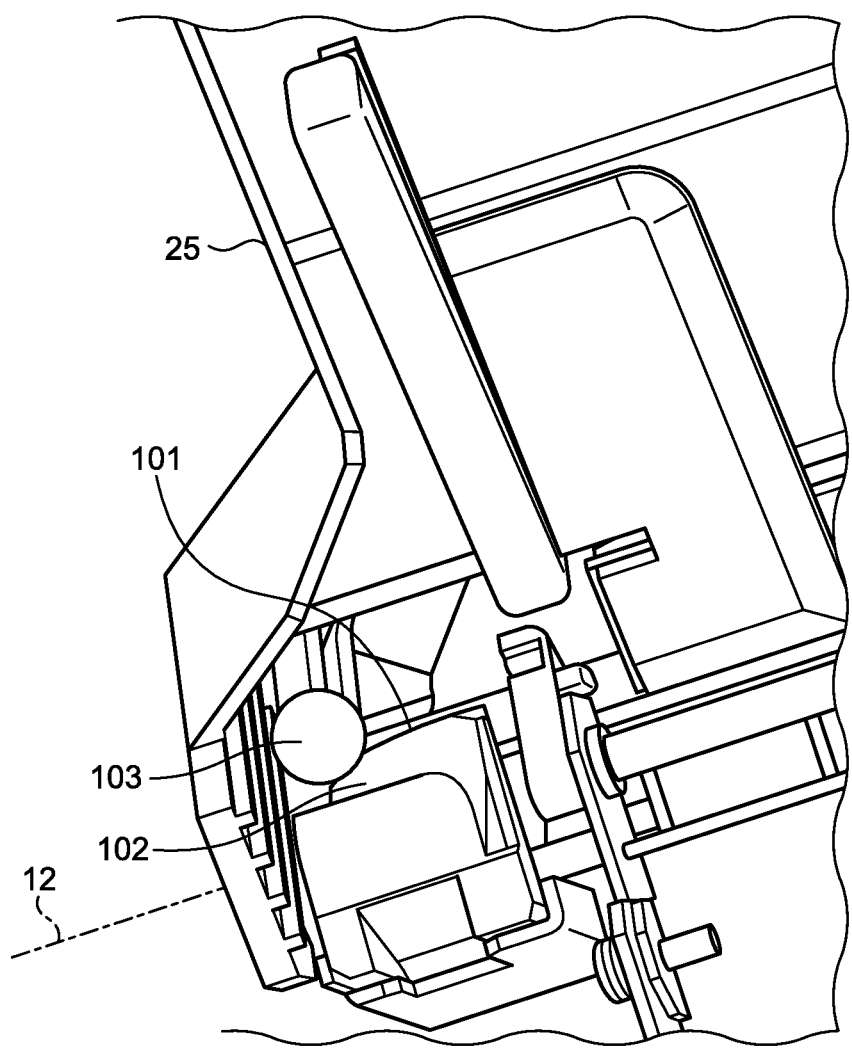
FIG. 9 is a perspective view of a skew plate.

FIG. 9 is a perspective view of a skew plate 101. As illustrated in FIG. 9, the second interlock mechanism 82 further includes the skew plate 101. The skew plate 101 is fixed to the frame 20. In the skew plate 101, a guide surface 102 is formed. The guide surface 102 is formed to be oblique to the rotation axis 12, in other words, is not parallel with the rotation axis 12 and is not orthogonal to the rotation axis 12. The lever 91 includes a sphere 103. The sphere 103 is arranged on an end of the lever 91 and is fixed to the lever 91.

Figure 10:
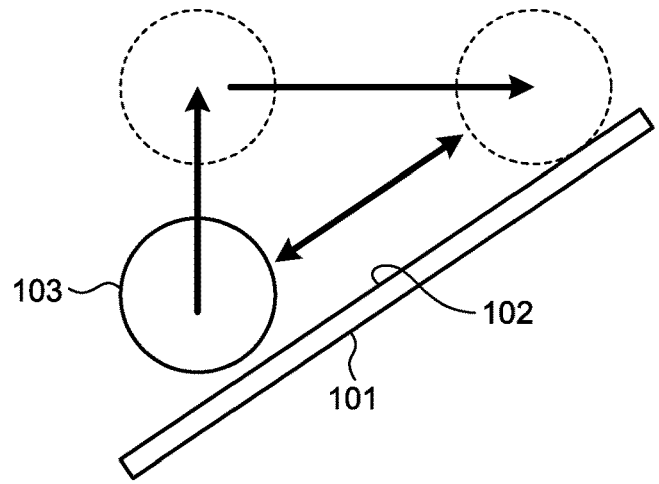
FIG. 10 is a schematic diagram of the skew plate and a sphere.

FIG. 10 is a schematic diagram of the skew plate 101 and the sphere 103. The skew plate 101 is fixed to the frame 20 and thus, when the first shooter member 25 turns about the rotation axis 12, the skew plate 101 moves with respect to the first shooter member 25. In other words, the skew plate 101 is arranged in a skew plate development position when the first shooter member 25 is arranged in the shooter development position, and the skew plate 101 is arranged in a skew plate storage position when the first shooter member 25 is arranged in the shooter storage position. When the skew plate 101 moves with respect to the first shooter member 25, the sphere 103 slides on the guide surface 102 of the skew plate 101 and accordingly the lever 91 turns about the rotation axis 96. When the skew plate 101 is arranged in the skew plate development position, the lever 91 is arranged in the lever development position.

Figure 11:
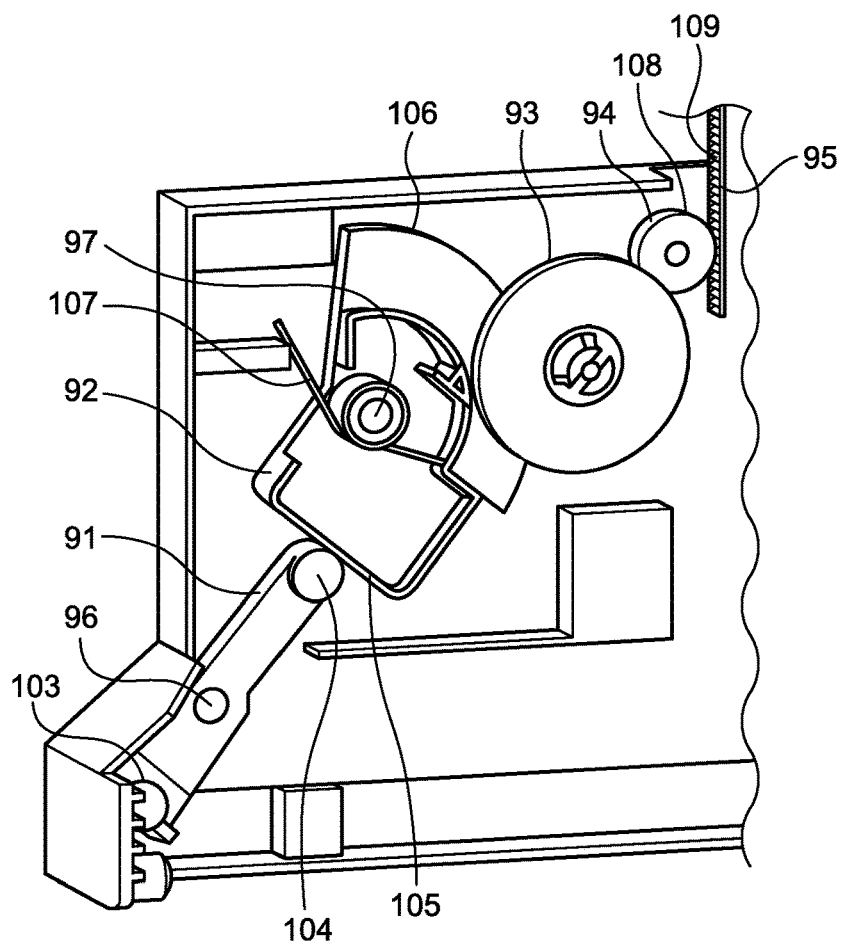
FIG. 11 is a perspective view of the second interlock mechanism.

FIG. 11 is a perspective view of the second interlock mechanism 82. When the skew plate 101 moves from the skew plate storage position to the skew plate development position in the case where the lever 91 is arranged in the lever storage position, the lever 91 turns about the rotation axis 96 clockwise in FIG. 11, thereby being arranged in the lever development position. The lever 91 includes a sliding part 104. The sliding part 104 is fixed to the other end of the lever 91 on the opposite side of the end of the lever 91 on which the sphere 103 is formed.

In the sector gear 92, a sliding surface 105 and teeth 106 are formed. The sliding surface 105 is formed to be approximately flat. When the lever 91 turns about the rotation axis 96 clockwise in FIG. 11 in the case where the sector gear 92 is arranged in the sector gear storage position, the sliding part 104 of the lever 91 slides on the sliding surface 105 and accordingly the sector gear 92 turns counterclockwise in FIG. 11. When the lever 91 is arranged in the lever development position, the sector gear 92 is arranged in the sector gear development position.

The sector gear 92 has a spring 107. The spring 107 is formed of an elastic member and one end of the spring 107 is fixed to the sector gear 92 and the other end is fixed to the first shooter member 25. The spring 107 applies an elastic force to the sector gear 92 to cause the sector gear 92 to turn about the rotation axis 97 clockwise in FIG. 11. In other words, when the skew plate 101 is arranged in the skew plate storage position, an elastic force is applied from the spring 107 and thus the sector gear 92 moves to the sector gear storage position. When the sector gear 92 turns clockwise in FIG. 11 in the case where the skew plate 101 is arranged in the skew plate storage position, the sliding part 104 of the lever 91 slides on the sliding surface 105 and accordingly the sector gear 92 turns counterclockwise in FIG. 11. When the sector gear 92 is arranged in the sector gear storage position in the case where the skew plate 101 is arranged in the skew plate storage position, the lever 91 is arranged in the lever storage position.

The gear 94 is formed into a disk shape and teeth 108 are formed on the outer circumference of the gear 94. In the rack 95, teeth 109 are formed on a side opposed to the gear 94. The teeth 109 are engaged with the teeth 108. The teeth 109 of the gear 94 are engaged with the teeth 108 of the rack 95 and thus, when the gear 94 rotates, the second shooter member 26 moves in parallel with the extension-contraction direction 28. The second shooter member 26 is arranged in the extension position when the gear 94 is arranged in the gear development position, and the second shooter member 26 is arranged in the contraction position when the gear 94 is arranged in the gear storage position.

Figure 12:
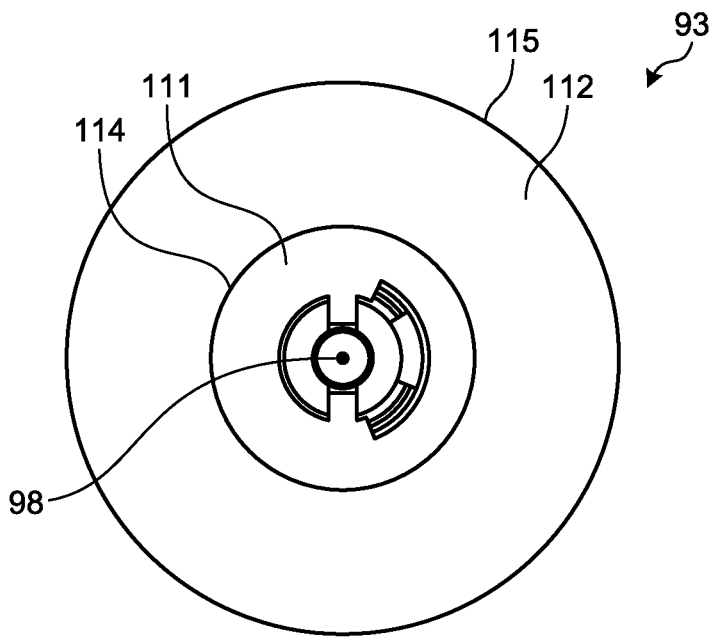
FIG. 12 is a plane view of a deceleration gear.

FIG. 12 is a plane view of the deceleration gear 93. As illustrated in FIG. 12, the deceleration gear 93 includes a small gear 111 and a large gear 112. The small gear 111 is formed into a disk shape and teeth 114 are formed on the outer circumference of the small gear 111. The teeth 114 are engaged with the teeth 106 of the sector gear 92. The large gear 112 is formed into a disk shape whose diameter is larger than that of the small gear 111, and teeth 115 are formed on the outer circumference of the large gear 112. The teeth 115 are engaged with the teeth 108 of the gear 94. The large gear 112 is fixed to the small gear 111.

The teeth 114 engage with the teeth 106 of the sector gear 92 and thus, when the sector gear 92 turns, the deceleration gear 93 rotates about the rotation axis 98. The deceleration gear 93 is arranged in the deceleration gear development position when the sector gear 92 is arranged in the sector gear development position, and the deceleration gear 93 is arranged in the deceleration gear storage position when the sector gear 92 is arranged in the sector gear storage position. The teeth 115 are engaged with the teeth 108 of the gear 94 and thus, when the deceleration gear 93 rotates, the gear 94 rotates about the rotation axis 99. The gear 94 is arranged in the gear development position when the deceleration gear 93 is arranged in the deceleration gear development position, and the gear 94 is arranged in the gear storage position when the deceleration gear 93 is arranged in the deceleration gear storage position.

Figure 13:
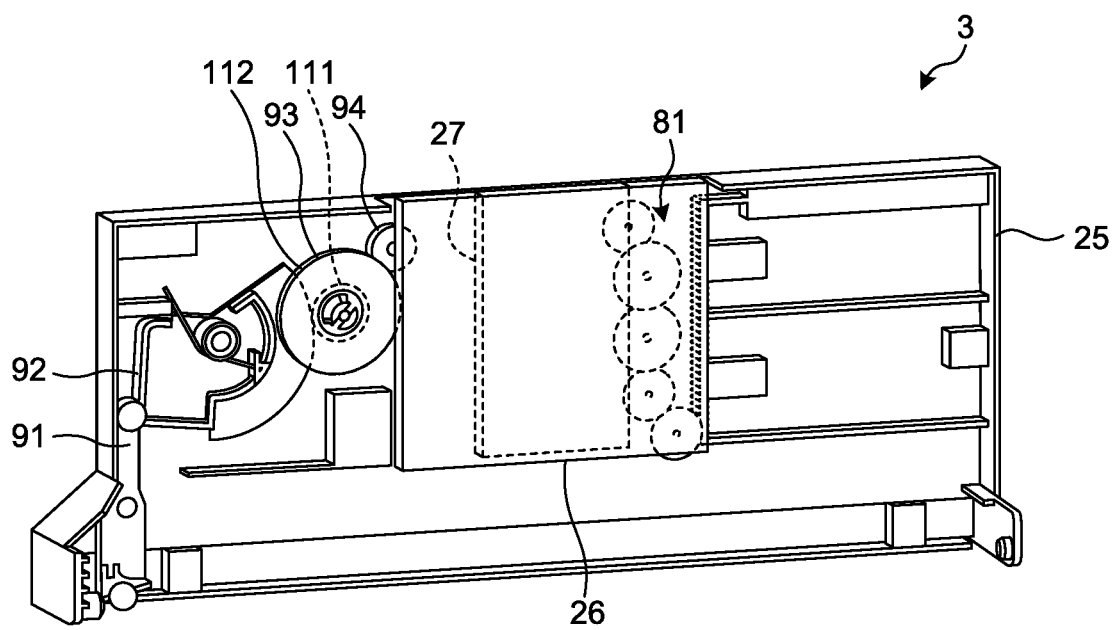
FIG. 13 is a perspective view of the second interlock mechanism in the case where a first shooter member is arranged in a shooter storage position.

FIG. 13 is a perspective view of the second interlock mechanism 82 in the case where the first shooter member 25 is arranged in the shooter storage position. When the first shooter member 25 is arranged in the shooter storage position, the second interlock mechanism 82 arranges the second shooter member 26 in the contraction position as illustrated in FIG. 13. In other words, the first shooter member 25 is arranged in the shooter storage position and thus the skew plate 101 is arranged in the skew plate storage position. The skew plate 101 is arranged in the skew plate storage position and the elastic force of the spring 107 is applied to the sector gear 92 so that the sector gear 92 is arranged in the sector gear storage position. The sector gear 92 is arranged in the sector gear storage position and accordingly the lever 91 is arranged in the lever storage position. The sector gear 92 is arranged in the sector gear storage position and accordingly the deceleration gear 93 is arranged in the deceleration gear storage position. The deceleration gear 93 is arrange in the deceleration gear storage position and accordingly the gear 94 is arranged in the gear storage position. The gear 94 is arranged in the gear storage position and accordingly the second shooter member 26 is arranged in the contraction position. The second shooter member 26 is arranged in the contraction position and accordingly the third shooter member 27 is arranged in the contraction position.

When the first shooter member 25 is arranged in the shooter development position, the second interlock mechanism 82 arranges the second shooter member 26 in the extension position as illustrated in FIG. 8. In other words, the first shooter member 25 is arranged in the shooter development position and thus the skew plate 101 is arranged in the skew plate development position. The skew plate 101 is arranged in the skew plate development position and accordingly the lever 91 is arranged in the lever development position. The lever 91 is arranged in the lever development position and accordingly the sector gear 92 is arranged in the sector gear development position. The sector gear 92 is arranged in the sector gear development position and accordingly the deceleration gear 93 is arranged in the deceleration development position. The deceleration gear 93 is arranged in the deceleration development position and accordingly the gear 94 is arranged in the gear development position. The gear 94 is arranged in the gear development position and accordingly the second shooter member 26 is arranged in the extension position. The second shooter member 26 is arranged in the extension position and accordingly the third shooter member 27 is arranged in the extension position.

Side Guide

Figure 14:
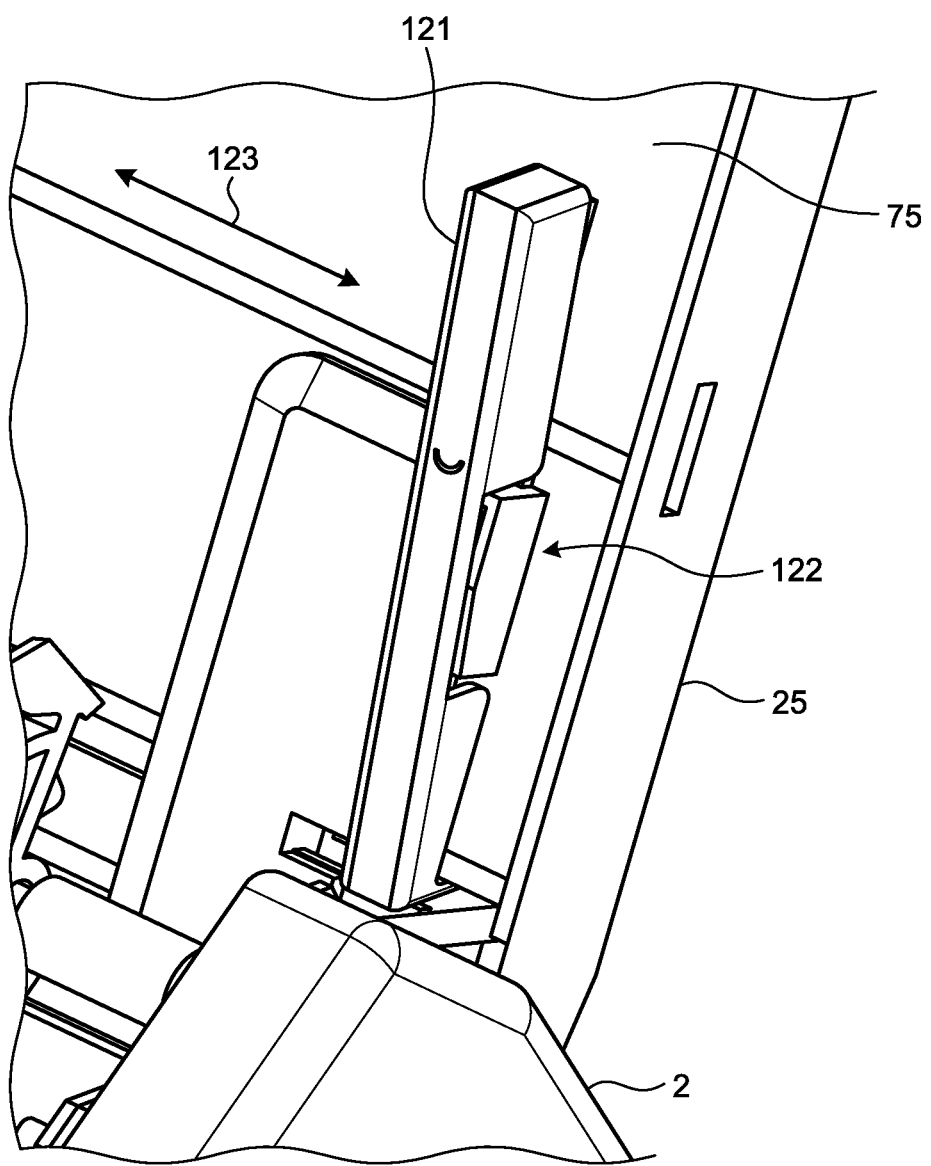
FIG. 14 is a perspective view of a side guide and a side guide interlock mechanism.

FIG. 14 is a perspective view of a side guide 121 and a side guide interlock mechanism 122. As illustrated in FIG. 14, the medium conveyance device 1 includes the side guide 121 and the side guide interlock mechanism 122. In the side guide 121, a guide surface is formed. The side guide 121 is arranged to protrude from the first shooter placement surface 75 of the first shooter member 25 and, the side guide 121 is arranged such that a plane along the side guide is orthogonal to a plane along the first shooter placement surface 75 and is parallel with the extension-contraction direction 28.

Figure 15:
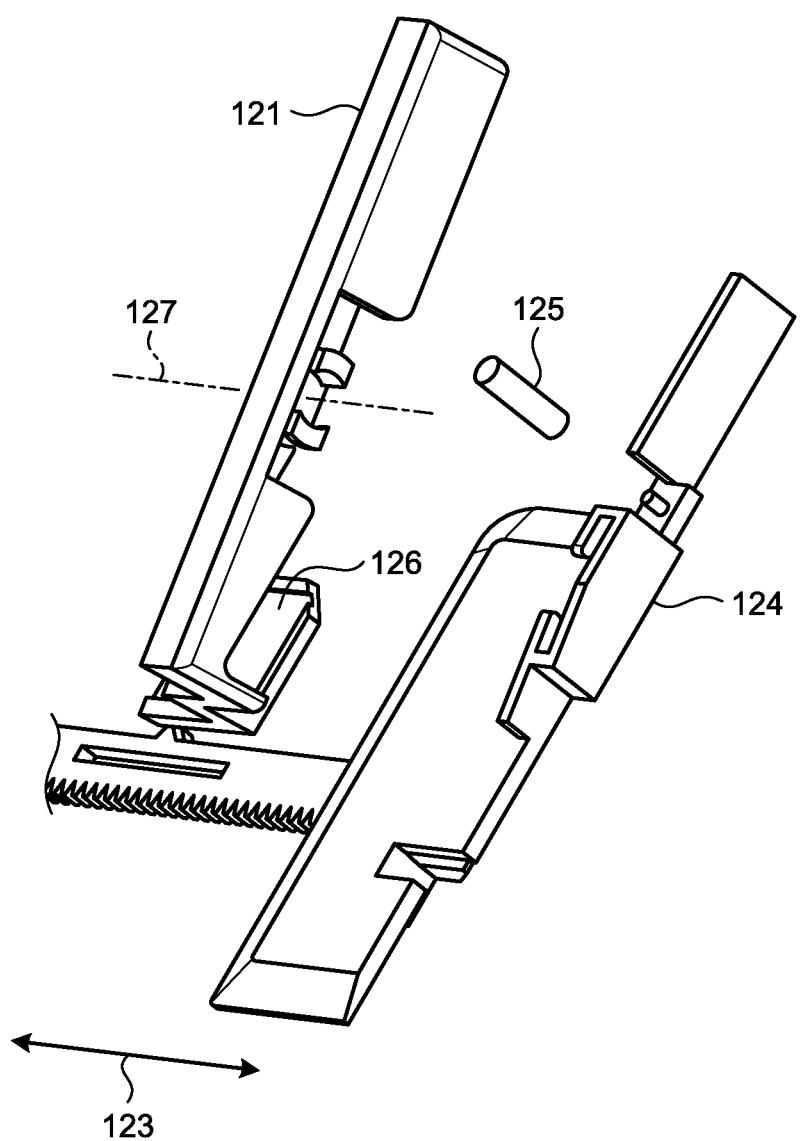
FIG. 15 is an exploded perspective view of the side guide interlock mechanism.

FIG. 15 is an exploded perspective view of the side guide interlock mechanism 122. As illustrated in FIG. 15, the side guide interlock mechanism 122 includes a side guide support member 124, a spring 125, and a weight 126. The side guide support member 124 is supported on the first shooter member 25 movably in a left-right direction 123. The left-right direction 123 is parallel with the rotation axis 12 of the first shooter member 25, in other words, parallel with the plane along which the first shooter placement surface 75 is and is orthogonal to the extension-contraction direction 28. The spring 125 is formed of an elastic member. One end of the spring 125 is fixed to the side guide support member 124 and the other end is fixed to the side guide 121.

Figure 16:
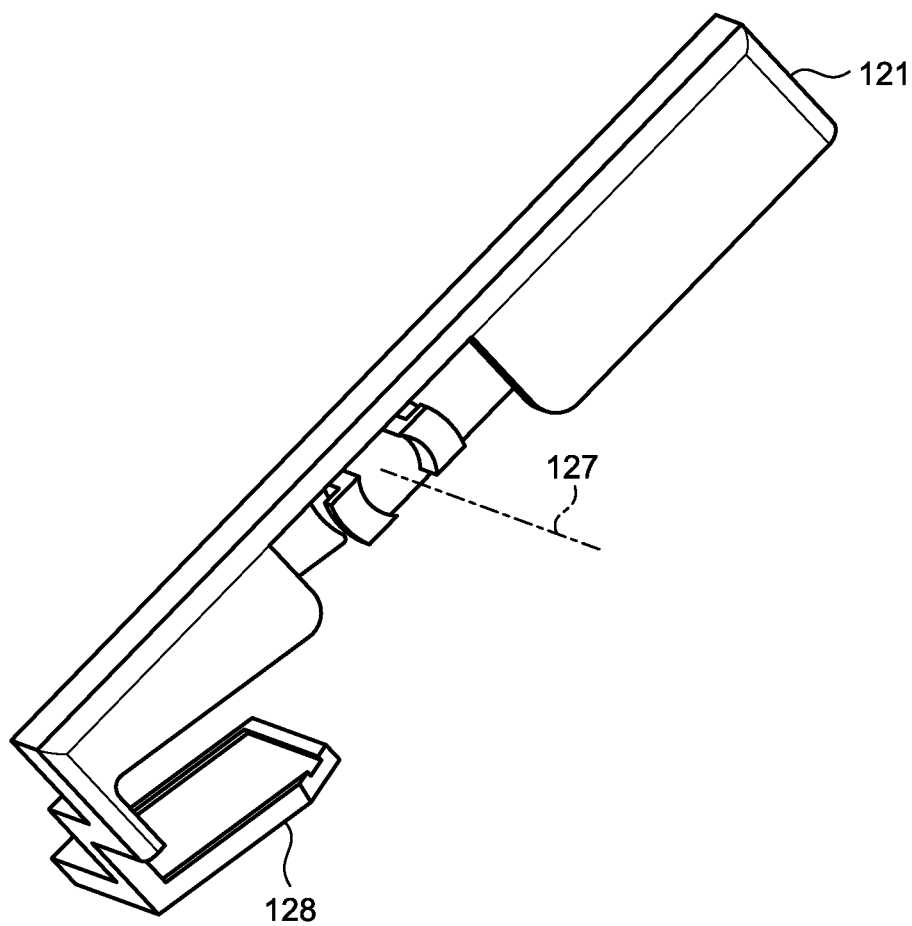
FIG. 16 is a side view of the side guide.

FIG. 16 is a side view of the side guide 121. As illustrated in FIG. 16, the side guide 121 is formed into a belt shape and is arranged such that its longitudinal direction is approximately parallel with the extension-contraction direction 28. The side guide 121 is supported on the side guide support member 124 rotatably about a rotation axis 127 to be arranged in a guide development position or a guide storage position. The rotation axis 127 is arranged approximately at the center of the side guide 121 in its longitudinal direction and is parallel with the left-right direction 123. In the side guide 121, a weight holder 128 is formed. The weight holder 128 is arranged at an end of the side guide 121 on a side close to the rotation axis 12 of the first shooter member 25. The weight 126 is joined to the weight holder 128. The weight 126 is joined to the weight holder 128 and thus applies the force of gravity that is applied to the weight 126 to the side guide 121.

Figure 17:
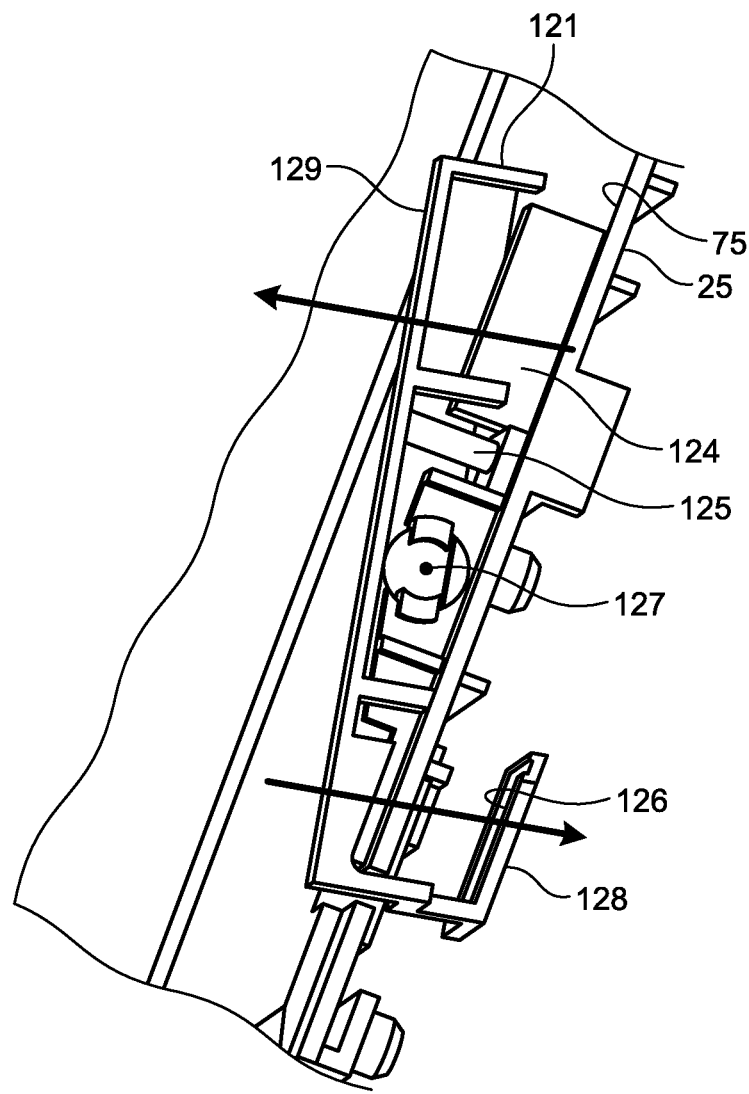
FIG. 17 is a cross-sectional view of the side guide in the case where the first shooter member is arranged in a shooter development position.

FIG. 17 is a cross-sectional view of the side guide 121 in the case where the first shooter member 25 is arranged in the shooter development position. The spring 125 keeps applying an elastic force to the side guide 121 to cause the side guide 121 to turn counterclockwise in FIG. 17. The weight 126 is arranged under the rotation axis 127 when the first shooter member 25 is arranged in the shooter development position. A component force of the force of gravity of the weight 126 that causes the side guide 121 to turn is relatively small because the weight 126 is arranged under the rotation axis 127. For this reason, when the first shooter member 25 is arranged in the shooter development position, the external force is applied to the side guide 121 to cause the side guide 121 to turn counterclockwise in FIG. 17.

When the first shooter member 25 is arranged in the shooter development position, the side guide 121 is arranged in the guide development position as illustrated in FIG. 17.

The side guide 121 is arranged in the guide development position and thus the height of the side guide 121 with respect to the first shooter placement surface 75 is relatively high. The height is equal to the distance from an end 129 of the side guide 121 on a side distant from the rotation axis 12 of the first shooter member 25 to the first shooter placement surface 75. In other words, the end 129 is the farthest part of the side guide 121 from the first shooter placement surface 75 when the side guide 121 is arranged in the guide development position. The side guide support member 124 further regulates turn of the side guide 121 such that the side guide 121 does not turn clockwise in FIG. 17 when the side guide 121 is arranged in the side guide development position.

Figure 18:
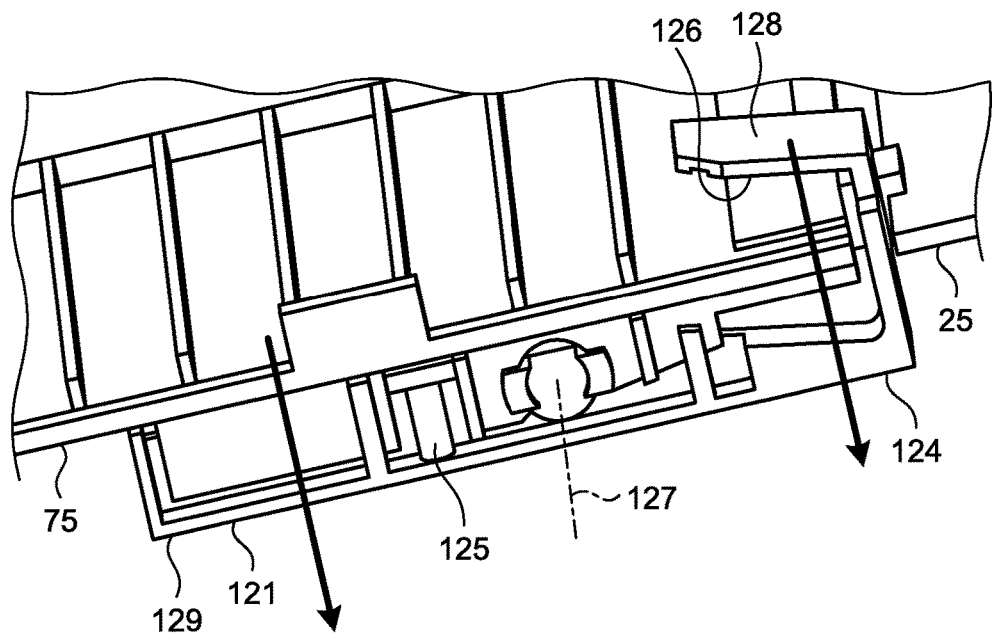
FIG. 18 is a cross-sectional view of the side guide in the case where the first shooter member is arranged in the shooter storage position.

FIG. 18 is a cross-sectional view of the side guide 121 in the case where the first shooter member 25 is arranged in the shooter storage position. The weight 126 is distant from the rotation axis 127 in the horizontal direction when the first shooter member 25 is arranged in the shooter storage position, compared to the case where the first shooter member 25 is arranged in the shooter development position. The component force of the force of gravity of the weight 126 that causes the side guide 121 to turn is relatively large because the weight 126 is distant from the rotation axis 127 in the horizontal direction. For this reason, when the first shooter member 25 is arranged in the shooter storage position, an external force is applied to the side guide 121 to cause the side guide 121 to turn clockwise in FIG. 18. The weight of the weight 126 is designed such that the force of the weight 126 to cause the side guide 121 to turn is larger than the elastic force of the spring 125 when the first shooter member 25 is arranged in the shooter storage position.

When the first shooter member 25 is arranged in the shooter storage position, the side guide 121 is arranged in the guide storage position as illustrated in FIG. 18. The side guide 121 is arranged in the guide storage position and thus the height of the side guide 121 with respect to the first shooter placement surface 75 lowers, compared to the case where the side guide 121 is arranged in the side guide development position. In other words, the side guide 121 moves from the guide development position to the guide storage position and accordingly the end 129 gets close to the first shooter placement surface 75. The side guide 121 is designed not to contact the stacker 6 that is arranged in the stacker storage area 18 when the side guide 121 is arranged in the guide storage position. The side guide support member 124 further regulates turn of the side guide 121 such that, when the side guide 121 is arranged in the guide storage position, the side guide 121 does not turn clockwise in FIG. 18.

The medium conveyance device 1 further includes another side guide and another side guide interlock mechanism. The side guide is formed in the same manner as that of the side guide 121, and the side guide and the side guide 121 form side guides in a pair. The side guide is arranged with its side guide is opposed to the guide surface of the side guide 121. The side guide interlock mechanism is formed similarly to the side guide interlock mechanism 122. The side guide interlock mechanism causes the side guide to move in synchronization with the side guide 121. The side guide interlock mechanism arranges the side guide in a guide storage position when the first shooter member 25 is arranged in the shooter storage position, and the side guide interlock mechanism arranges the side guide in the guide development position when the first shooter member 25 is arranged in the shooter development position.

Operations of Medium Conveyance Device 1 of First Embodiment

To read an image of an original with the medium conveyance device 1, first of all, a user moves the first shooter member 25 to the shooter development position to develop the shooter 3. When the first shooter member 25 moves to the shooter development position, the second interlock mechanism 82 causes the second shooter member 26 to move to the extension position. In other words, the first shooter member 25 moves to the shooter development position and accordingly the skew plate 101 moves to the skew development position. The skew plate 101 moves to the skew development position and accordingly the lever 91 moves to the lever development position. The lever 91 moves to the lever development position and accordingly the sector gear 92 moves to the sector gear development position. The sector gear 92 moves to the sector gear development position and accordingly the deceleration gear 93 moves to the deceleration gear development position. The deceleration gear 93 moves to the deceleration gear development position and accordingly the gear 94 moves to the gear development position. The gear 94 moves to the gear development position and accordingly the second shooter member 26 moves to the extension position. The second shooter member 26 moves to the extension position and accordingly the third shooter member 27 moves to the extension position. The second shooter member 26 moves to the extension position and accordingly the first interlock mechanism 81 pulls the third shooter member 27 out of the second shooter member 26 to cause the third shooter member to move to the extension position.

When the first shooter member 25 is arranged in the shooter development position, the height of the side guide 121 with respect to the first shooter placement surface 75 increases. In other words, when the first shooter member 25 is arranged in the shooter development position, the elastic force of the spring 125 causes the side guide 121 to turn about the rotation axis 127 and thus to be arranged in the guide development position.

After the shooter 3 develops and extends, the user moves the side guides in a pair including the side guide 121 in parallel with the left-right direction 123 and places an original on the shooter placement surface 11 such that the original to be read with the medium conveyance device 1 is sandwiched between the side guides in a pair. After placing the original on the shooter placement surface 11, the user operates the medium conveyance device 1 such that the image on the original placed on the shooter 3 is read by the medium conveyance device 1.

When the user operates the medium conveyance device 1, the conveyance device 31 causes the pick roller 41, the first drive roller 42, the second drive roller 44, and the third drive roller 46 to rotate normally. When the pick roller 41, the first drive roller 42, the second drive roller 44, and the third drive roller 46 rotate normally, the stacker 6 develops and extends. The pick roller 41 rotates normally and accordingly the conveyance device 31 coveys originals placed on the shooter placement surface 11 one by one from the shooter placement surface 11 to the conveyance path 65. The guide surfaces of the side guides in a pair slide on the ends of the original and thus the side guides in a pair prevents the original from being fed obliquely to the medium conveyance device 1.

When the first pinch roller 43 contacts the original, the first pinch roller 43 rotates because of the force of conveyance of the original and pushes the original against the first drive roller 42. The first drive roller 42 rotates normally and accordingly the original that is pushed against the first drive roller 42 is conveyed to the conveyance path 65. The original conveyed on the conveyance path 65 is supplied to the read device 32. The original that is conveyed on the conveyance path 65 is guided to the space between the lower image sensor 61 and the upper image sensor 62 and then is supplied to the conveyance path 66. The original that is supplied to the conveyance path 66 is pushed by the second pinch roller 45 against the second drive roller 44 and is conveyed on the conveyance path 66 because of normal rotation of the second drive roller 44.

In the read device 32, when the original is conveyed between the conveyance path 65 and the conveyance path 66, the lower image sensor 61 contacts the lower read surface of the original and reads the image on the lower read surface and the upper image sensor 62 contacts the upper read surface of the original and reads the image on upper the read surface.

When the thickness of the original conveyed on the conveyance path 65 is under a given threshold, the conveyance device 31 arranges the switch guide 38 in the return path guide position and, when the thickness of the original is above the given threshold, the conveyance device 31 arranges the switch guide 38 in the straight path guide position. When the switch guide 38 is arranged in the return path guide position, the switch guide 38 guides the original conveyed on the conveyance path 66 to the return conveyance path 67. The original guided to the return conveyance path 67 is pushed by the third pinch roller 47 against the third drive roller 46 and, because of normal rotation of the third drive roller 46, the original is conveyed on the return conveyance path 67 and is placed on the stacker placement surface 15 of the stacker 6. When the switch guide 38 is arranged in the straight path guide position, the switch guide 38 guides the original conveyed on the conveyance path to the straight conveyance path 68. The conveyance device 31 ejects the original guided on the straight conveyance path 68 to the outside of the casing 2.

When the original is ejected via the return conveyance path 67 or the straight conveyance path 68 and there is no original placed on the shooter 3, the conveyance device 31 causes the pick roller 41, the first drive roller 42, the second drive roller 44, and the third drive roller 46 to rotate inversely. The pick roller 41, the first drive roller 42, the second drive roller 44, and the third drive roller 46 rotate inversely and accordingly the stacker 6 contracts and is stored in the stacker storage area 18.

Paper is exemplified as an original whose thickness is under the given threshold. The original has flexibility and thus tends not to have curvature even when conveyed on the return conveyance path 67 and paper jamming tends not to occur on the return conveyance path 67. Heavy paper and plastic cards, such as a credit card, are exemplified as an original whose thickness is above the given threshold. Such an original tends to have curvature when conveyed on the return conveyance path 67 or paper jamming tends to occur on the return conveyance path 67. Because of such tendency, in the medium conveyance device 1, ejection of a thick original via the straight conveyance path 68 without conveyance of the original on the return conveyance path 67 tends not to cause curvature in the original and tends not cause paper jamming on the return conveyance path 67.

When the stacker 6 is stored in the stacker storage area 18, the user is able to arrange the first shooter member 25 in the shooter storage position to store the shooter 3. When the first shooter member 25 moves to the shooter storage position, the second interlock mechanism 82 causes the second shooter member 26 to move to the contraction position. In other words, the first shooter member 25 moves to the shooter storage position and accordingly the skew plate 101 moves to the skew plate storage position. When the skew plate 101 is arranged in the skew plate storage position, the spring 107 applies an elastic force to the sector gear 92 to cause the sector gear 92 to move to the sector gear storage position. The skew plate 101 is arranged in the skew plate storage position and the sector gear 92 moves to the sector gear storage position and accordingly the lever 91 moves to the lever storage position.

The sector gear 92 moves to the sector gear storage position and accordingly the deceleration gear 93 moves to the deceleration gear storage position. The deceleration gear 93 moves to the deceleration gear storage position and accordingly the gear 94 moves to the gear storage position. The gear 94 moves to the gear storage position and accordingly the rack 95 causes the second shooter member 26 to be pushed into the first shooter device 25, thereby causing the second shooter member 26 to move to the contraction position. The second shooter member 26 moves to the contraction position and accordingly the first interlock mechanism 81 causes the third shooter member 27 to be pushed into the second shooter member 26, thereby causing the third shooter member 27 to move to the contraction position.

When the first shooter member 25 is arranged in the shooter storage position, the height of the side guide 121 with respect to the first shooter placement surface 75 lowers. In other words, when the first shooter member 25 is arranged in the shooter storage position, the side guide 121 turns about the rotation axis 127 because of the force of gravity of the weight 126 and accordingly is arranged in the guide storage position. When the first shooter member 25 is arranged in the shooter storage position, the side guide 121 is arranged in the guide storage position and thus the side guide 121 does not contact the stacker 6 that is arranged in the stacker storage area 18. The side guide 121 does not contact the stacker 6 and thus does not damage the stacker 6 and accordingly it is possible to prevent the appearance of the stacker 6 from being marred.

Effect of Medium Conveyance Device 1 of First Embodiment

The medium conveyance device 1 of the first embodiment includes the body, the first shooter member 25, the side guide 121, and the side guide interlock mechanism 122. In the first shooter member 25, the first shooter placement surface 75 is formed. The first shooter member 25 is supported on the body movably to be arranged in the shooter development position or the shooter storage position. When the first shooter member 25 is arranged in the shooter development position, the first shooter placement surface 75 is oriented upward and, when the first shooter member 25 is arranged in the shooter storage position, the first shooter placement surface 75 is opposed to the body. The side guide 121 is supported on the first shooter member 25 movably to be arranged in the guide development position or the guide storage position. The height of the side guide 121 being arranged in the guide storage position with respect to the first shooter placement surface 75 is lower than the height of the side guide 121 being arranged in the guide development position. When the side guide 121 is arranged in the guide development position, the side guide 121 regulates move of the original placed on the first shooter placement surface 75. The side guide interlock mechanism 122 causes the side guide 121 to move along with move of the first shooter member 25. In other words, when the first shooter member 25 is arranged in the shooter development position, the side guide interlock mechanism 122 causes the side guide 121 to be arranged in the guide development position. Furthermore, when the first shooter member 25 is arranged in the shooter storage position, the side guide interlock mechanism 122 causes the side guide 121 to be arranged in the guide storage position. The side guide 121 is formed not to contact other parts (for example, the stacker 6) of the medium conveyance device 1 when the first shooter member 25 is arranged in the shooter storage position in the case where the side guide 121 is arranged in the guide storage position.

When the first shooter member 25 is arranged in the shooter storage position, the height of the side guide 121 is lowered and thus it is possible to prevent the side guide 121 from contacting other parts (for example, the stacker 6) of the medium conveyance device 1. The medium conveyance device 1 prevents the side guide 121 from contacting other parts of the medium conveyance device 1, thereby preventing the parts from being damaged.

The side guide 121 of the medium conveyance device 1 of the first embodiment is supported by the body on the first shooter member 25 rotatably about the rotation axis 127 orthogonal to the direction in which the original is conveyed. The level of the end 129 of the side guide 121 on the side distant from the body with respect to the first shooter placement surface 75 is higher when the side guide 121 is arranged in the guide development position than when the side guide 121 is arranged in the guide storage position.

In the medium conveyance device 1, the end 129 of the side guide 121 increases when the first shooter member 25 is arranged in the shooter development position and this makes it possible to prevent the original from being obliquely conveyed compared to another side guide whose end on the side close to the body is high.

The side guide interlock mechanism 122 of the first medium conveyance device 1 of the first embodiment includes the weight 126 that applies the force of gravity to the side guide 121 to cause the side guide 121 to move to the guide storage position when the first shooter member 25 is arranged in the shooter storage position.

The medium conveyance device 1 uses the weight 126 to cause the side guide 121 to move and thus it is possible to simplify the structure of the side guide interlock mechanism 122, easily manufacture the medium conveyance device 1, and accordingly reduce the manufacturing costs.

The side guide interlock mechanism 122 of the medium conveyance device 1 of the first embodiment includes the weight 126. Alternatively, the weight 126 may be omitted if the side guide 121 is configured to move to the guide storage position by its own weight when the first shooter member 25 is arranged in the shooter storage position.

The side guide interlock mechanism 122 of the medium conveyance device 1 of the first embodiment further includes the spring 125 that applies an elastic force to the side guide 121 to cause the side guide 121 to move to the guide development position when the first shooter member 25 is arranged in the shooter development position.

The medium conveyance device 1 uses the spring 125 and the weight 126 to cause the side guide 121 to move and thus it is possible to simplify the structure of the side guide interlock mechanism 122, easily manufacture the side guide interlock mechanism 122, and thus reduce the manufacturing costs.

The side guide interlock mechanism 122 of the medium conveyance device 1 of the first embodiment includes the spring 125. Alternatively, the spring 125 may be omitted if the side guide 121 is configured to move to the guide development position by its own weight when the first shooter member is arranged in the shooter development position.

Second Embodiment

Figure 19:
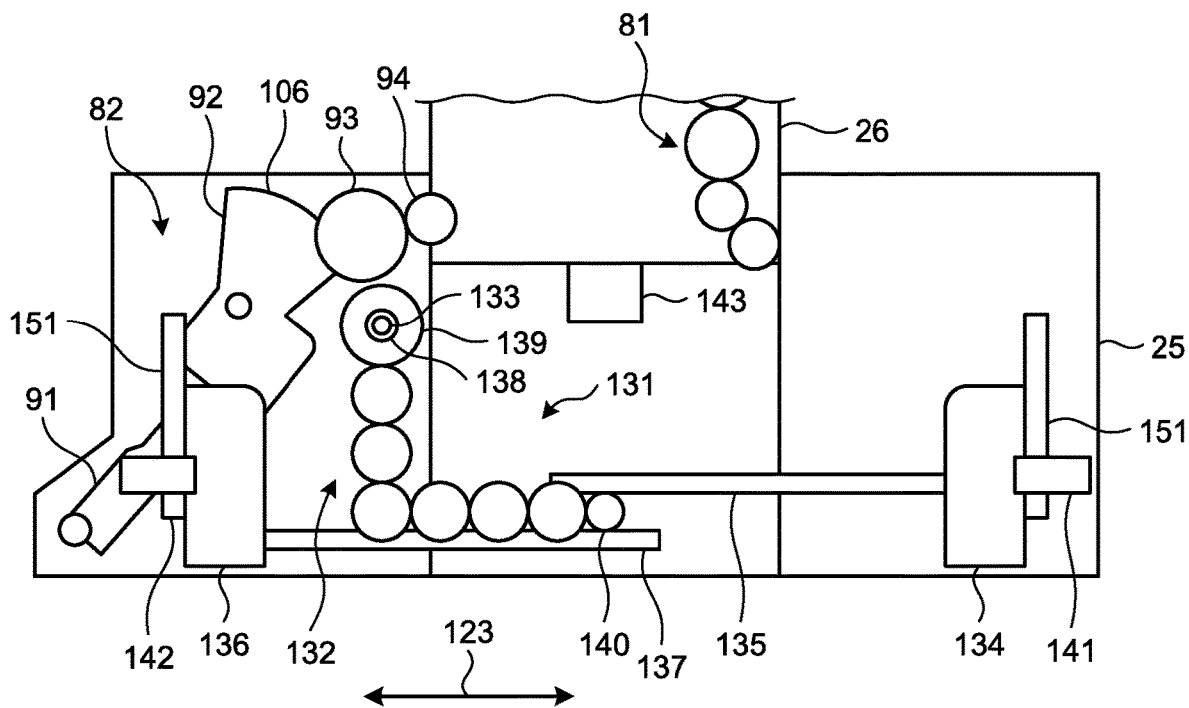
FIG. 19 is a schematic diagram of a side guide interlock mechanism of a medium conveyance device of a second embodiment.

A medium conveyance device of a second embodiment is obtained by replacing the side guide interlock mechanism 122 of the medium conveyance device 1 of the above-described first embodiment and replacing the side guide 121 with another side guide. FIG. 19 is a schematic diagram of a side guide interlock mechanism 131 of the medium conveyance device of the second embodiment. As illustrated in FIG. 19, the side guide interlock mechanism 131 includes the second interlock mechanism 82. The side guide interlock mechanism 131 further includes a plurality of gear 132, a torque limiter 133, a first side guide support member 134, a first rack 135, a second side guide support member 136, and a second rack 137. Each of the gears 132 is formed into a disk shape and teeth are formed on the outer circumference of the each of the gears 132. The gears 132 are arranged to be engaged with each other and are rotatably supported on the first shooter member 25. The teeth of the gears 132 are engaged with each other and thus, when one of the gears 132 rotates, all the gears 132 rotate.

The torque limiter 133 includes a gear 138. Teeth formed on the outer circumference of the gear 138 engage with the teeth 106 of the sector gear 92. The torque limiter 133 transmits rotation of the sector gear 92 to a gear 139 that is one of the gears 132. The torque limiter 133 further blocks transmission of rotation of the gear 138 to the gear 139 when an absolute value of the torque transmitted from the gear 138 to the gear 139 exceeds a given value.

The first side guide support member 134 is supported on the first shooter member 25 movably in parallel with the left-right direction 123 to be arranged in a first center position or a first end position. The first rack 135 is formed into a bar shape and teeth are formed in the first rack 135. The first rack 135 is arranged along a straight line parallel with the left-right direction 123 and is fixed to the first side guide support member 134. For this reason, along with the first side guide support member 134, the first rack 135 moves in parallel with the left-right direction 123 with respect to the first shooter member 25. The teeth of the first rack 135 are engaged with the teeth of a gear 140 that is another one of the gears 132. The gear 140 rotates and accordingly the first rack 135 moves with respect to the first shooter member 25 in parallel with the left-right direction 123.

The second side guide support member 136 is supported on the first shooter member 25 movable in parallel with the left-right direction 123 to be arranged in a second center position or a second end position. The second rack 137 is formed into a bar shape and teeth are formed in the second rack 137. The second rack 137 is arranged along the straight line parallel with the left-right direction 123 and is fixed to the second side guide support member 136. The second rack 137 thus moves with respect to the first shooter member 25 along with the second side guide support member 136 in parallel with the left-right direction 123. The teeth of the second rack 137 are engaged with the teeth of the gear 140. The gear 140 rotates and accordingly the second rack 137 moves with respect to the first shooter member 25 in parallel with the left-right direction 123.

The side guide interlock mechanism 131 further includes a first protrusion 141, a second protrusion 142, and a third protrusion 143. The first protrusion 141 is fixed to the first shooter member 25 such that, when the first side guide support member 134 is arranged in the first end position, the first protrusion 141 is arranged near the first side guide support member 134. The second protrusion 142 is fixed to the first shooter member 25 such that, when the second side guide support member 136 is arranged in the second end position, the second protrusion 142 is arranged near the second side guide support member 136. The third protrusion 143 is fixed to the second shooter member 26 and is formed to move along with the second shooter member 26. When the first side guide support member 134 is arranged in the first end position in the case where the second shooter member 26 is arranged in the contraction position, the third protrusion 143 is arranged near the first side guide support member 134. When the second side guide support member 136 is arranged in the second end position in the case where the second shooter member 26 is arranged in the contraction position, the third protrusion 143 is arranged near the second side guide support member 136.

Figure 20:
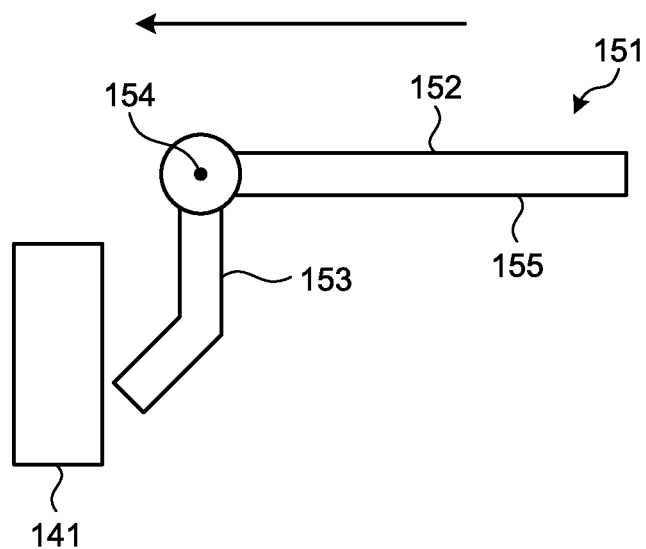
FIG. 20 is a schematic diagram of a side guide of the medium conveyance device of the second embodiment.

FIG. 20 is a schematic diagram of a side guide 151 of the medium conveyance device of the second embodiment. As illustrated in FIG. 20, the side guide 151 includes a side guide body 152 and a sliding part 153. The side guide body 152 is formed into a belt shape and a guide surface 155 is formed in the side guide body 152. The sliding part 153 is formed to protrude from one surface of the side guide body 152 to the side of the first shooter member 25 and is fixed to the side guide body 152. The side guide 151 is supported on the first side guide support member 134 rotatably about a rotation axis 154 to be arranged in a guide development position or a guide storage position. The rotation axis 154 is parallel with the extension-contraction direction 28. The side guide body 152 is arranged such that, when the side guide 151 is arranged in the guide storage position, the side guide body 152 is along with a plane parallel with the first shooter placement surface 75 of the first shooter member 25 and the guide surface 155 is opposed to the first shooter placement surface 75.

When the side guide 151 is arranged in the guide storage position, the sliding part 153 is arranged in the first shooter member 25. The sliding part 153 is formed to move toward the first protrusion 141 when the second side guide support member 136 moves toward the second end position in the case where the side guide 151 is arranged in the guide storage position.

Figure 21:
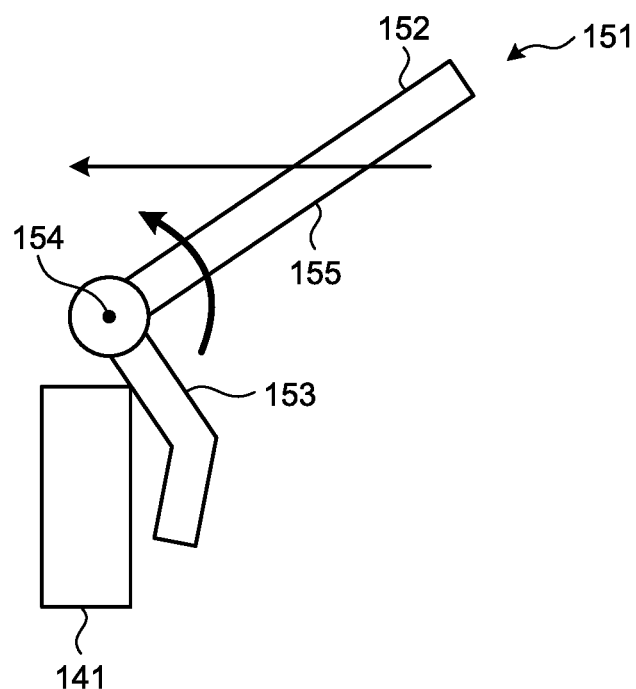
FIG. 21 is a schematic diagram of the side guide during move of a first side guide support member from a first center position to a first end position.

FIG. 21 is a schematic diagram of the side guide 151 during move of the first side guide support member 134 from the first center position to the first end position. In the side guide 151, the sliding part 153 bumps against the first protrusion 141 during move of the first side guide support member 134 from the first center position to the first end position. The sliding part 153 bumps against the first protrusion 141 and thus the side guide 151 turns counterclockwise about the rotation axis 154.

Figure 22:
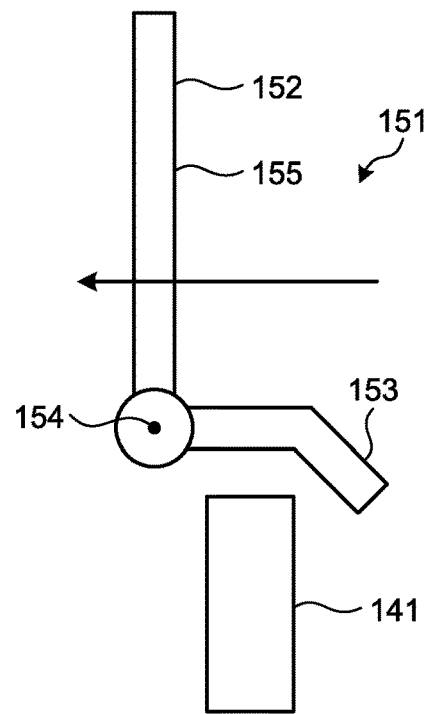
FIG. 22 is a schematic diagram of the side guide in the case where the first side guide support member is arranged on the first end position.

FIG. 22 is a schematic diagram of the side guide 151 in the case where the first side guide support member 134 is arranged in the first end position. When the first side guide support member 134 is arranged in the first end position, as illustrated in FIG. 22, the sliding part 153 is pushed by the first protrusion 141 and accordingly the side guide 151 is arranged in the guide development position. When the side guide 151 is arranged in the guide development position, the side guide body 152 is arranged along a plane orthogonal to the first shooter placement surface 75 of the first shooter member 25.

Figure 23:
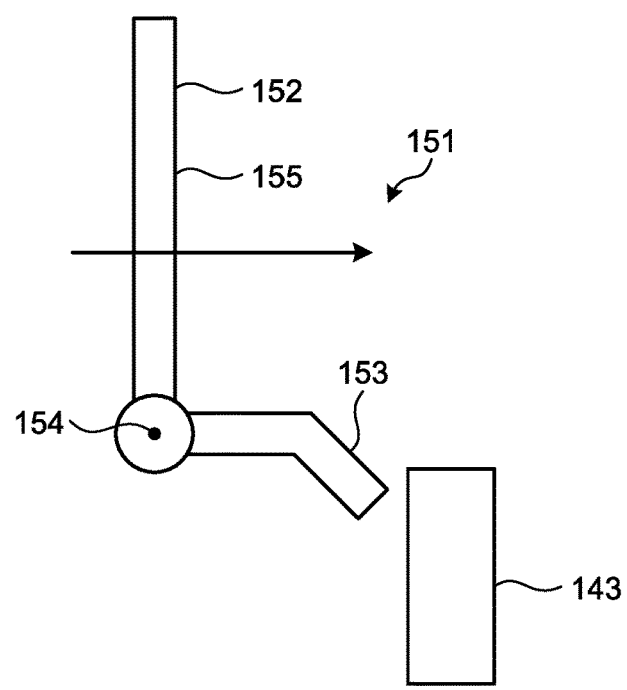
FIG. 23 is a schematic diagram of the side guide during move of a second shooter member to a contraction position.

FIG. 23 is a schematic diagram of the side guide 151 during move of the second shooter member 26 to the contraction position. The sliding part 153 is formed further to move toward the third protrusion 143 as illustrated in FIG. 23 when the second side guide support member 136 moves toward the second center position.

Figure 24:
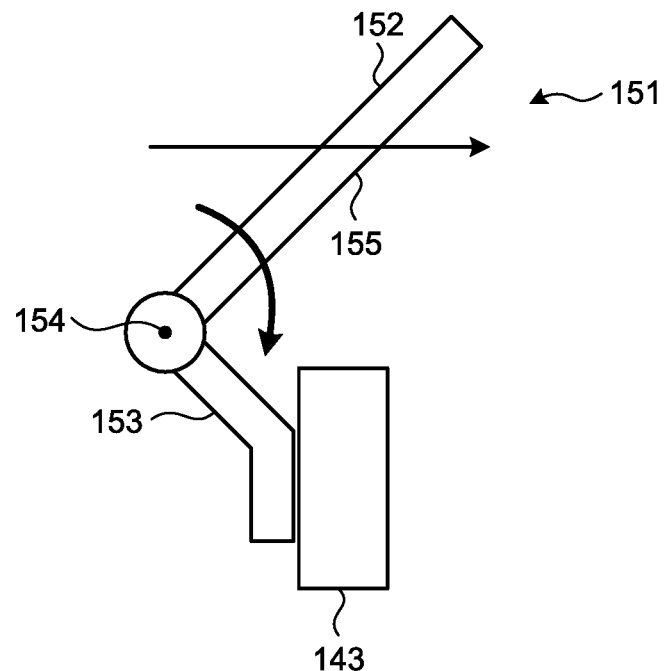
FIG. 24 is a schematic diagram of the side guide during move of the first side guide support member from the first end position to the first center position.

FIG. 24 is a schematic diagram of the side guide 151 during move of the first side guide support member 134 from the first end position to the first center position. In the side guide 151, the sliding part 153 bumps against the third protrusion 143 as illustrated in FIG. 24 during move of the first side guide support member 134 from the first end position to the first center position. The sliding part 153 bumps against the third protrusion 143 and accordingly the side guide 151 turns clockwise about the rotation axis 154.

Figure 25:
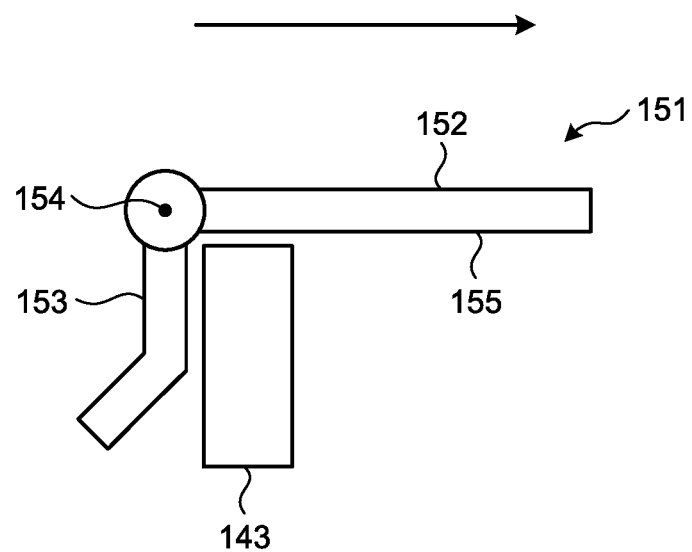
FIG. 25 is a schematic diagram of the side guide in the case where the first side guide support member is arranged in the first center position.

FIG. 25 is a schematic diagram of the side guide 151 in the case where the first side guide support member 134 is arranged in the first center position. When the first side guide support member 134 is arranged in the first center position, as illustrated in FIG. 25, the sliding part 153 is pushed by the third protrusion 143 and accordingly the side guide 151 is arranged in the guide storage position. The side guide body 152 is arranged to be along the plane parallel with the first shooter placement surface 75 of the first shooter member 25 when the side guide 151 is arranged in the guide storage position.

For this reason, the height of the side guide body 152 with respect to the first shooter placement surface 75 is lower when the side guide 151 is arranged in the guide storage position than when the side guide 151 is arranged in the guide development position. The side guide body 152 is formed to be low so as not to contact the stacker 6 when the first shooter member 25 is arranged in the shooter storage position in the case where the side guide 151 is arranged in the guide storage position.

The medium conveyance device of the second embodiment further includes another side guide. The side guide is formed similarly to the side guide 151, and the side guide and the side guide 151 form side guides in a pair. In other words, a guide surface is formed in the side guide and the side guide is rotatably supported on the second side guide support member 136. When the second side guide support member 136 is arranged in the second end position, the side guide is pushed by the second protrusion 142 and thus is arranged in the guide development position. When the side guide is arranged in the guide development position, the guide surface of the side guide is opposed to the guide surface 155 of the side guide 151. When the second side guide support member 136 is arranged in the second center position, the side guide is pushed by the third protrusion 143 and accordingly is arranged in the guide storage position. When the side guide is arranged in the guide storage position, the guide surface is opposed to the first shooter placement surface 75 of the first shooter member 25.

Operations of Side Guide Interlock Mechanism 131

When the first shooter member 25 moves to the shooter development position, the side guide interlock mechanism 131 causes the side guide 151 to move to the guide development position. In other words, the first shooter member 25 moves to the shooter development position and accordingly the sector gear 92 moves to the sector gear development position. The sector gear 92 moves to the sector gear development position and accordingly the gear 138 of the torque limiter 133 rotates. The torque limiter 133 transmits rotation of the gear 138 to the gear 139 of the gears 132. The gear 139 rotates and accordingly all the gears 132 rotate. The gear 140 of the gears 132 rotates and accordingly the first rack 135 causes the first side guide support member 134 to move to the first end position. The first side guide support member 134 is arranged in the first end position and accordingly the sliding part 153 is pushed by the first protrusion 141 and thus the side guide 151 is arranged in the guide development position. The first shooter member 25 moves to the shooter development position and accordingly the side guide interlock mechanism 131 further arranges the side guide that forms a pair with the side guide 151 in the guide development position as in the case of the side guide 151. When the side guides in a pair are arranged in the guide development position, the ends of the original placed on the shooter 3 slide on the guide surfaces 155 and thus the original is prevented from being fed obliquely to the medium conveyance device.

When the first shooter member 25 moves to the shooter storage position, the side guide interlock mechanism 131 causes the side guide 151 to move to the guide storage position. In other words, the first shooter member 25 moves to the shooter storage position and accordingly the sector gear 92 moves to the sector gear storage position. The sector gear 92 moves to the sector gear storage position and accordingly the gear 138 of the torque limiter 133 rotates. The torque limiter 133 transmits rotation of the gear 138 to the gear 139 of the gears 132. The gear 139 rotates and accordingly all the gears 132 rotate. The gear 140 of the gears 132 rotates and accordingly the first rack 135 causes the first side guide support member 134 to move to the first center position. The first side guide support member 134 is arranged in the first center position and accordingly the sliding part 153 is pushed by the third protrusion 143 and thus the side guide 151 is arranged in the guide storage position. The first shooter member 25 moves to the shooter storage position and accordingly the side guide interlock mechanism 131 further arranges the side guide that forms the pair with the side guide 151 in the guide storage position as in the case of the side guide 151.

The side guide 151 is pushed by the third protrusion 143 and accordingly is positioned in the guide development position and accordingly the first side guide support member 134 stops moving. The first side guide support member 134 stops moving and accordingly the gears 132 stops rotating. The gears 132 stops rotating and accordingly the torque limiter 133 blocks transmission of rotation of the gear 138 to the gear 139. The torque limiter 133 blocks transmission of rotation of the torque limiter 133 and accordingly, even when the side guide 151 is close to the center initially, the side guide interlock mechanism 131 is able to prevent jumping in the gears 132, etc., thereby preventing damage.

Each of the side guides in a pair is arranged in the guide storage position and thus, even when the first shooter member 25 is arranged in the shooter storage position, the side guides do not contact the stacker 6 and accordingly the stacker 6 is prevented from being damaged.

Effect of Medium Conveyance Device of Second Embodiment

The medium conveyance device of the second embodiment further includes the second shooter member 26 and the first side guide support member 134. In the second shooter member 26, the second shooter placement surface 76 is formed. The second shooter member 26 is supported on the first shooter member 25 movably to be arranged in the extension position or the contraction position. The second shooter placement surface 76 is aligned with the first shooter placement surface 75 when the second shooter member 26 is arranged in the extension position, and the second shooter placement surface 76 overlaps the first shooter placement surface 75 when the second shooter member 26 is arranged in the contraction position. The first side guide support member 134 is movably supported on the first shooter member 25. The side guide interlock mechanism 131 includes the gears 132, the first rack 135, the first protrusion 141, the third protrusion 143, and the second interlock mechanism 82. The gears 132 and the first rack 135 converts motion of the first shooter member 25 to move with respect to the body and between the shooter development position and the shooter storage position into motion of the first side guide support member 134 to move. The first protrusion 141 and the third protrusion 143 convert motion of the first side guide support member 134 into motion of the side guide 151 to move between the guide development position and the guide storage position. The second interlock mechanism 82 converts motion of the first side guide support member 134 to motion of the second shooter member 26 to move between the extension position and the contraction position.

In the medium conveyance device, the side guide interlock mechanism 131 doubles as part of the second interlock mechanism 82 that causes the first shooter member 25 to extend and contract and thus it is possible to reduce the number of parts and therefore reduce the manufacturing costs.

The side guide interlock mechanism 131 of the medium conveyance device of the second embodiment further includes the first protrusion 141 and the third protrusion 143. The side guide interlock mechanism 131 causes the side guide 151 to move along with move of the first shooter member 25 such that the side guide 151 bumps against the first protrusion 141 when the first shooter member 25 is arranged in the shooter development position. The side guide interlock mechanism 131 further causes the side guide 151 to move along with move of the first shooter member 25 such that the side guide 151 bumps against the third protrusion 143 when the first shooter member 25 is arranged in the shooter storage position. The side guide 151 bumps against the first protrusion 141 and accordingly is arranged in the guide development position, and the side guide 151 bumps against the third protrusion 143 and accordingly is arranged in the guide storage position.

The medium conveyance device uses the first protrusion 141 and the third protrusion 143 to move the side guide 151 and thus it is possible to simplify the structure of the side guide interlock mechanism 131, manufacture the medium conveyance device easily, and reduce the manufacturing costs.

The side guide interlock mechanism 131 of the medium conveyance device of the second embodiment further includes the torque limiter 133. The torque limiter 133 does not cause the side guide 151 to move when the side guide 151 bumps against the first protrusion, and the torque limiter 133 causes the side guide 151 to move to the side of the first protrusion 141 when the side guide 151 does not bump against the first protrusion 141.

In the medium conveyance device, the torque limiter 133 is provided in the side guide interlock mechanism 131 and thus it is possible to prevent jumping in the gears 132 and prevent the side guide interlock mechanism 131 from being damaged.

Third Embodiment

Figure 26:
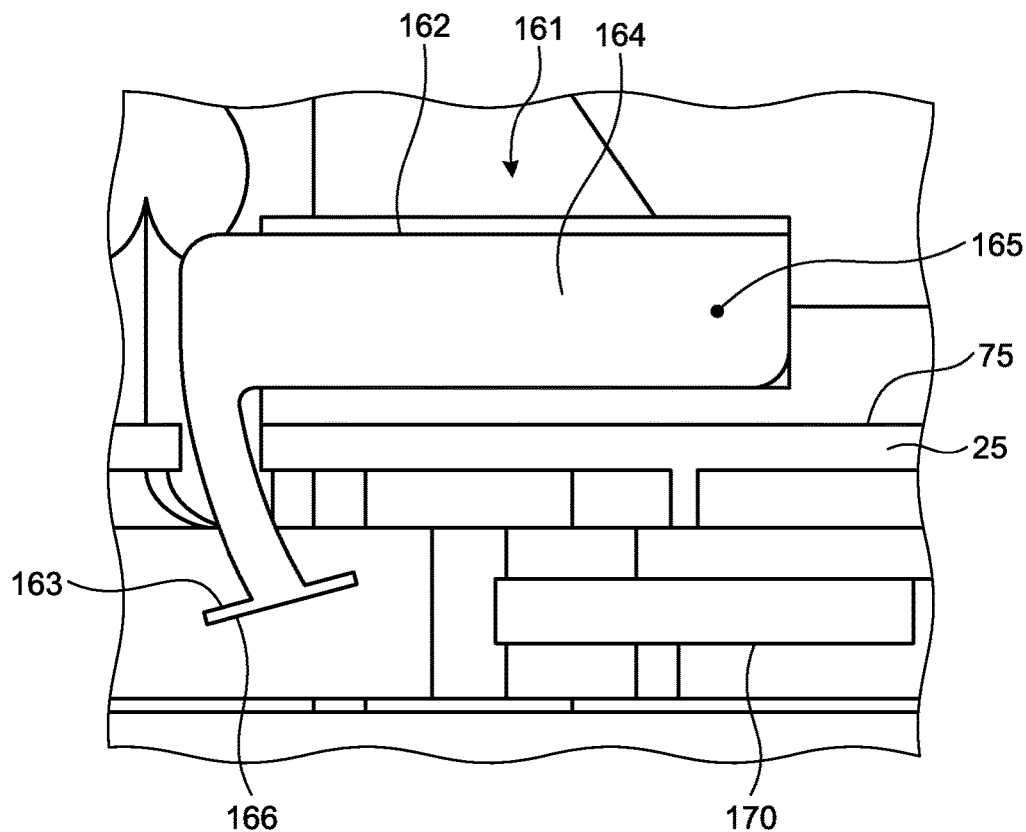
FIG. 26 is a side view of a side guide of a medium conveyance device of a third embodiment.

A medium conveyance device of a third embodiment is obtained by replacing the side guide 121 of the medium conveyance device 1 of the first embodiment with another side guide and adding a slide member and a slide member interlock mechanism. FIG. 26 is a side view of a side guide 161 of the medium conveyance device of the third embodiment. As illustrated in FIG. 26, the side guide 161 includes a side guide body 162 and a sliding part 163 and includes a spring (not illustrated in FIG. 26). The side guide body 162 is formed into a belt shape and a guide surface 164 is formed in the side guide body 162. The side guide body 162 is arranged to protrude from the first shooter placement surface 75 of the first shooter member 25, and the guide surface 164 is arranged to be orthogonal to the left-right direction 123. The side guide 161 is supported on the first shooter member 25 rotatably about a rotation axis 165 to be arranged in a guide storage position or a guide development position. The rotation axis 165 is parallel with the left-right direction 123. The spring applies an elastic force to the side guide body 162 to cause the side guide body 162 to be arranged in the guide storage position.

In the sliding part 163, a sliding surface 166 is formed. The sliding part 163 is arranged in the first shooter member 25 and is fixed to the side guide 161.

Figure 27:
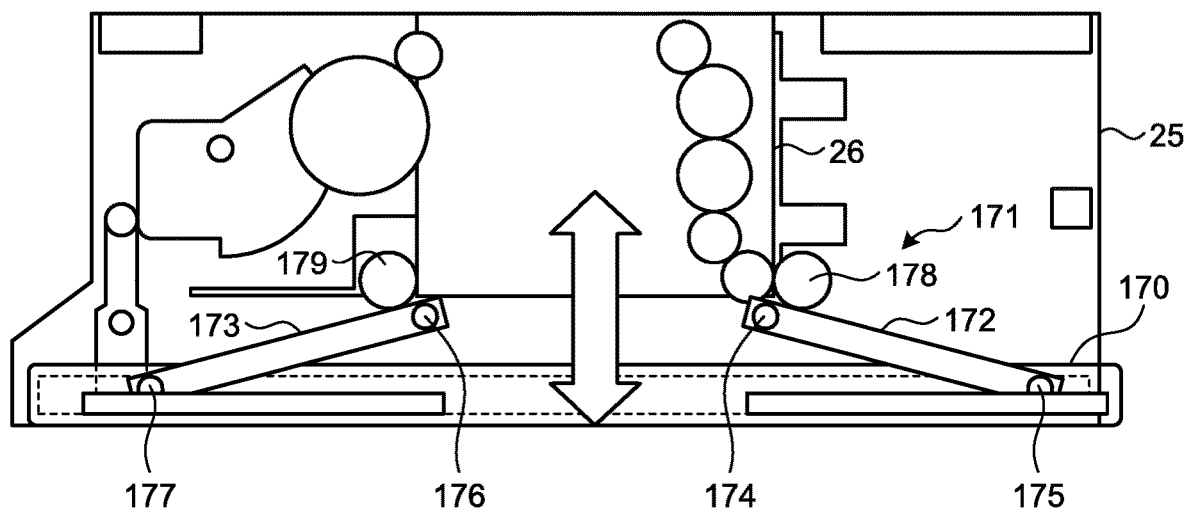
FIG. 27 is a plane view of a slide member and a slide member interlock mechanism of the medium conveyance device of the third embodiment.

FIG. 27 is a plane view of a slide member 170 and a slide member interlock mechanism 171 of the medium conveyance device of the third embodiment. As illustrated in FIG. 27, the slide member 170 is formed into a belt shape and is arranged in the first shooter member 25. The slide member interlock mechanism 171 includes a first link 172, a second link 173, a first slider 174, a second slider 175, a third slider 176, a fourth slider 177, a first boss 178, and a second boss 179. The first link 172 is arranged into a bar shape and is arranged in the first shooter member 25. The second link 173 is arranged into a bar shape and is arranged in the first shooter member 25. The first slider 174 supports one end of the first link 172 such that the end of the first link 172 is movable along one side of the second shooter member 26 on a side close to the rotation axis 12. The second slider 175 supports the other end of the first link 172 such that the other end of the first link 172 is movable along the longitudinal direction of the slide member 170. The third slider 176 supports one end of the second link 173 such that the end of the second link 173 is movable along a side of the second shooter member 26 on a side close to the rotation axis 12. The fourth slider 177 supports the other end of the second link 173 such that the other end of the second link 173 is movable along the longitudinal direction of the slide member 170. The first boss 178 is arranged in the first shooter member 25 to contact the first link 172 and is fixed in the first shooter member 25. The second boss 179 is arranged in the first shooter member 25 to contact the second link 173 and is fixed in the first shooter member 25. The slide member interlock mechanism 171 is formed as described above, thereby supporting the slide member 170 movably in parallel with the extension-contraction direction 28 such that the slide member 170 is arranged in a slide member development position or in a slide member storage position.

When the second shooter member 26 is arranged in the contraction position, the slide member 170 is arranged in the slide member storage position. When arranged in the slide member storage position, the slide member 170 is positioned at an internal end of the first shooter member 25 on the side of the rotation axis 12. When arranged in the slide member storage position, the slide member 170 does not contact the sliding part 163 of the side guide 161.

Figure 28:
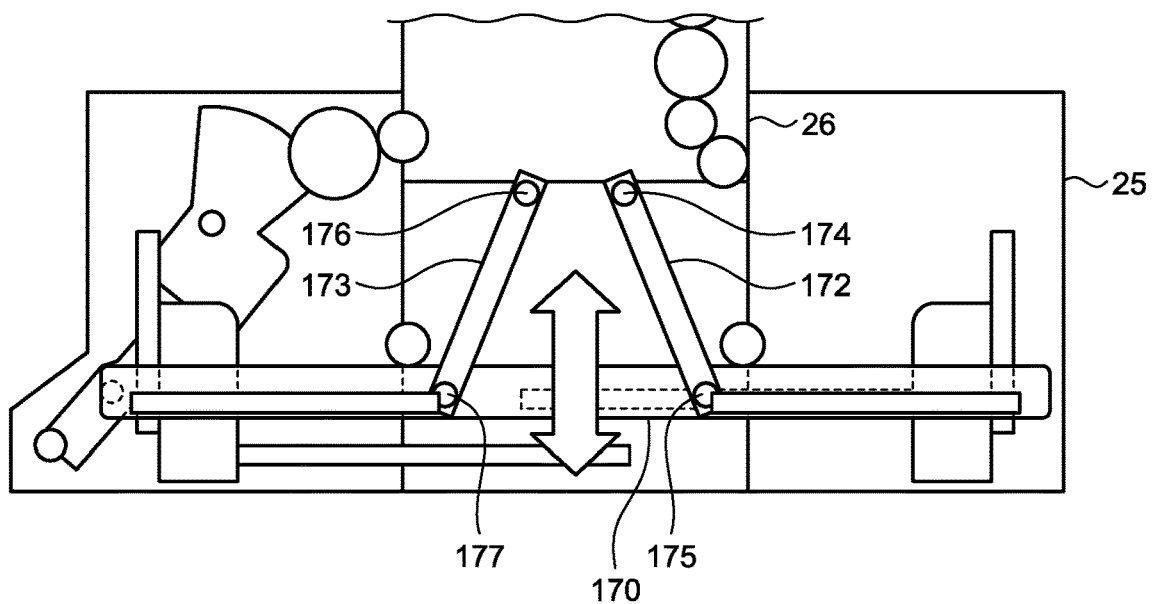
FIG. 28 is a plane view of the slide member and the slide member interlock mechanism of the medium conveyance device of the third embodiment in the case where a second shooter member is arranged in an extension position.

FIG. 28 is a plane view of the slide member 170 and the slide member interlock mechanism 171 of the medium conveyance device of the third embodiment in the case where the second shooter member 26 is arranged in the extension position. When the second shooter member 26 is arranged in the extension position, the slide member interlock mechanism 171 arranges the slide member 170 in the slide member development position as illustrated in FIG. 28. In other words, when the second shooter member 26 moves to the extension position, the first slider 174 and the second shooter member 26 cause the one end of the first link 172 to move to the side distant from the rotation axis 12. When the second shooter member 26 moves to the extension position, the third slider 176 and the second shooter member 26 cause the end of the second link 173 to move to a side distant from the rotation axis 12. When the one end of the first link 172 moves to the side distant from the rotation axis 12, the first link 172 contacts the first boss 178 and accordingly turns clockwise in FIG. 28. The first link 172 turns and accordingly the first slider 174 causes the end of the first link 172 to move along one side of the second shooter member 26. When the end of the second link 173 moves to the side distant from the rotation axis 12, the second link 173 contacts the second boss 179 and turns counterclockwise in FIG. 28. The second link 173 turns and accordingly the third slider 176 causes the one end of the second link 173 to move along the side of the second shooter member 26.

The first link 172 turns and accordingly the second slider 175 causes the other end of the first link 172 to move along the slide member 170, the second link 173 turns and accordingly the fourth slider 177 causes the other end of the second link 173 to move along the slide member 170, the first link 172 moves to the side distant from the rotation axis 12 and accordingly the second slider 175 causes the slide member 170 to move to the side distant from the rotation axis 12. The second link 173 moves to the side distant from the rotation axis 12 and accordingly the fourth slider 177 causes the slide member 170 to move to the side distant from the rotation axis 12.

Figure 29:
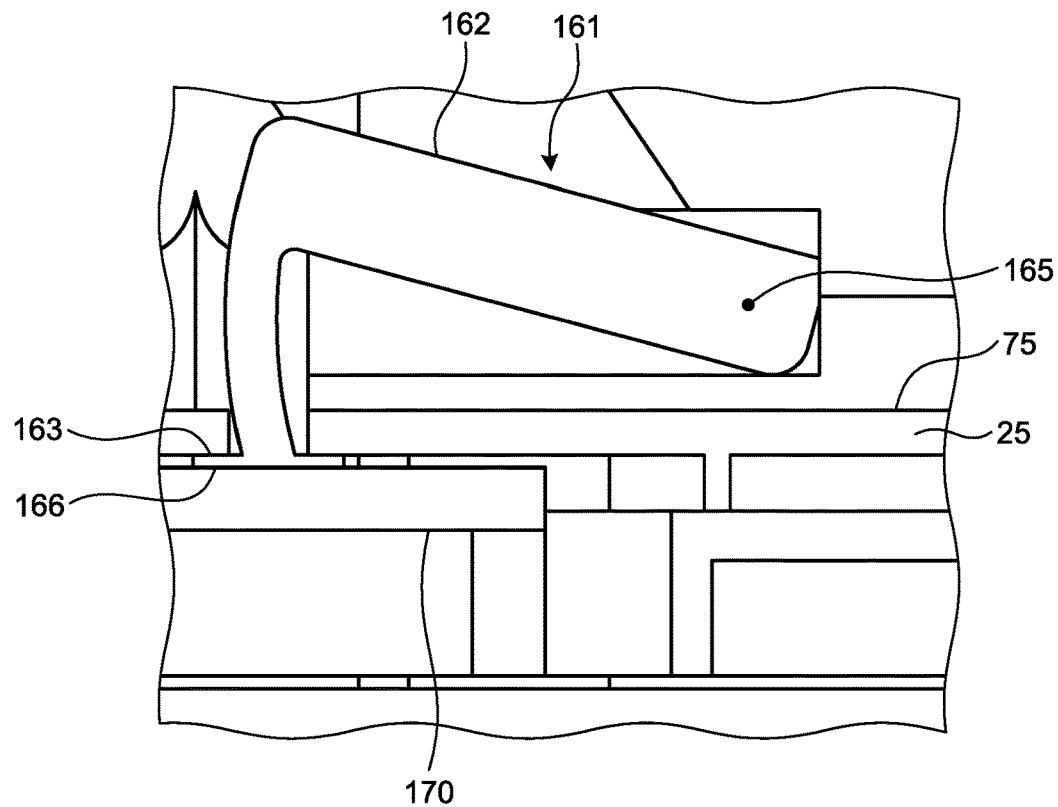
FIG. 29 is a side view of the slide member and the side guide of the medium conveyance device of the third embodiment in the case where the second shooter member is arranged in the extension position.

FIG. 29 is a side view of the slide member 170 and the side guide 161 of the medium conveyance device of the third embodiment in the case where the second shooter member 26 is arranged in the extension position. When the second shooter member 26 is arranged in the extension position, the slide member 170 is arranged in the slide member development position as illustrated in FIG. 29. When arranged in the slide member development position, the slide member 170 bumps against the sliding surface 166 of the sliding part 163 of the side guide 161. The slide member 170 bumps against the sliding part 163 and accordingly the side guide 161 turns clockwise on the rotation axis 165 in FIG. 29 and is arranged in the guide development position.

When the second shooter member 26 is arranged in the contraction position, the slide member interlock mechanism 171 arranges the slide member 170 in the slide member storage position as illustrated in FIG. 27. In other words, the second shooter member 26 moves to the contraction position and accordingly the first slider 174 causes the one end of the first link 172 to move to the side close to the rotation axis 12. The second shooter member 26 moves to the contraction positon and accordingly the third slider 176 causes the one end of the second link 173 to move to the side close to the rotation axis 12. When the one end of the first link 172 moves to the side close to the rotation axis 12, the second slider 175 causes the slide member 170 to move to the side close to the rotation axis 12. When the one end of the second link 173 moves to the side close to the rotation axis 12, the fourth slider 177 causes the slide member 170 to move to the side close to the rotation axis 12. The slide member 170 moves to the side close to the rotation axis 12 and thus is arranged in the slide member storage position.

The one end of the first link 172 further moves to the side close to the rotation axis 12 and accordingly the first link 172 turns counterclockwise in FIG. 27. The one end of the second link 173 further moves to the side close to the rotation axis 12 and accordingly the second link 173 turns clockwise in FIG. 27. The first link 172 turns and accordingly the first slider 174 causes the one end of the first link 172 to move along the one side of the second shooter member 26. The first link 172 turns and accordingly the second slider 175 causes the other end of the first link first link to move along the slide member 170. The second link 173 turns and accordingly the third slider 176 causes the one end of the second link 173 to move along the one side of the second shooter member 26. the second link 173 turns and accordingly the fourth slider 177 causes the other end of the second link 173 to move along the slide member 170.

When arranged in the slide member storage position, the slide member 170 separates from the sliding part 163 of the side guide 161. The slide member 170 separates from the sliding part 163 and accordingly the side guide 161 turns counterclockwise in FIG. 29 because of the elastic force of the spring about the rotation axis 165 and is arranged in the guide storage position.

The slide member interlock mechanism 171 is formed as described above and thus, even when the distance by which the second shooter member 26 moves is longer than the distance by which the slide member 170 moves, the slide member interlock mechanism 171 is able to properly cause the slide member 170 to move along with the second shooter member 26.

The height of the side guide body 162 with respect to the first shooter placement surface 75 is lower when the side guide 161 is arranged in the guide storage position than when the side guide 161 is arranged in the guide development position. The side guide body 162 is formed to be low so as not to contact the stacker 6 when the first shooter member 25 is arranged in the shooter storage position in the case where the side guide 161 is arranged in the guide storage position.

In the medium conveyance device of the third embodiment, the slide member 170 is caused to move along with the second shooter member 26 and accordingly, as in the case of the medium conveyance device 1 of the first embodiment, it is possible to lower the side guide 161 when the first shooter member 25 is arranged in the storage position. In the medium conveyance device of the third embodiment, the side guide 161 is lowered when the first shooter member 25 is arranged in the storage position and thus it is possible to prevents the side guide 161 from contacting the stacker 6, thereby preventing the stacker 6 from being damaged. The spring may be omitted in the side guide 161 when the side guide body 162 is arranged in the guide storage position by its own weight in the case where the slide member 170 is arranged in the slide member storage positon.

Fourth Embodiment

Figure 30:
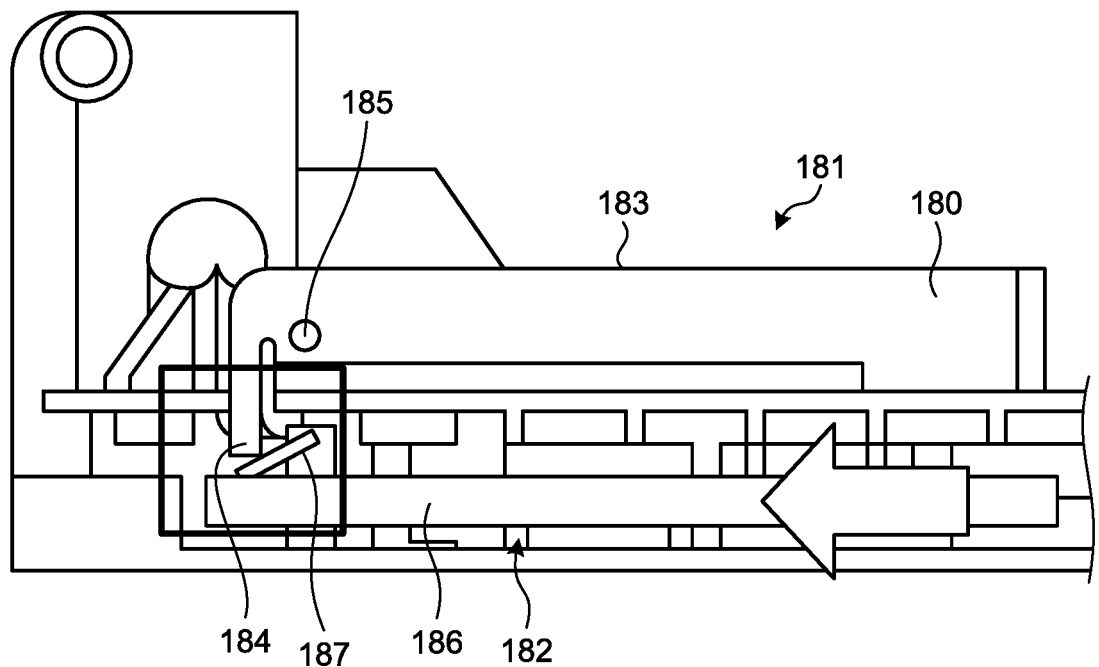
FIG. 30 is a side cross-sectional view of a side guide and a side guide interlock mechanism of a medium conveyance device of a fourth embodiment.

A medium conveyance device of a fourth embodiment is obtained by replacing the side guide 121 of the medium conveyance device 1 of the first embodiment with another side guide and replacing the side guide interlock mechanism 122 with another side guide interlock mechanism. FIG. 30 is a side cross-sectional view of a side guide 181 and a side guide interlock mechanism 182 of the medium conveyance device of the fourth embodiment. As illustrated in FIG. 30, the side guide 181 includes a side guide body 183 and a protrusion 184. The side guide body 183 is formed into a belt shape and a guide surface 180 is formed in the side guide body 183. The side guide body 183 is arranged to protrude from the first shooter placement surface 75 and is arranged such that the guide surface 180 is orthogonal to the left-right direction 123. The protrusion 184 is arranged in the first shooter member 25 and is fixed to the side guide body 183.

The side guide body 183 is supported on the first shooter member 25 rotatably about a rotation axis 185 to be arranged in a guide storage position or a guide development position. The side guide 181 further includes a spring (not illustrated in FIG. 30). The spring applies an elastic force to the side guide body 183 to turn the side guide body 183 counterclockwise in FIG. 30 about the rotation axis 185.

The side guide interlock mechanism 182 further includes a slide member 186 and a short-split-curtain member 187. The slide member 186 is formed into a platy shape and is fixed to the second shooter member 26. The slide member 186 is arranged in a slide member storage position when the second shooter member 26 is arranged in the contraction position and the slide member 186 is arranged in a slide member development position when the second shooter member 26 is arranged in the extension position.

Figure 31:
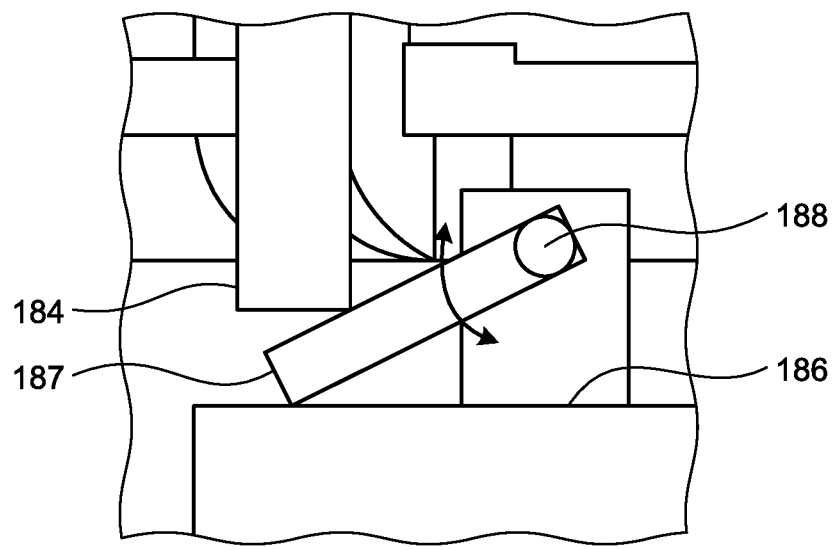
FIG. 31 is a side cross-sectional view of a short-split-curtain member.

FIG. 31 is a side cross-sectional view of the short-split-curtain member 187. As illustrated in FIG. 31, the short-split-curtain member 187 is formed into a platy shape and is arranged in the first shooter member 25. The short-split-curtain member 187 is arranged to contact the slide member 186 when the slide member 186 is arranged in the slide member storage position. The short-split-curtain member 187 is supported on the first shooter member 25 rotatably about a rotation axis 188. The rotation axis 188 is parallel with the left-right direction 123. The short-split-curtain member 187 is arranged further to turn about the rotation axis 188 to contact the protrusion 184 or separate from the protrusion 184.

Figure 32:
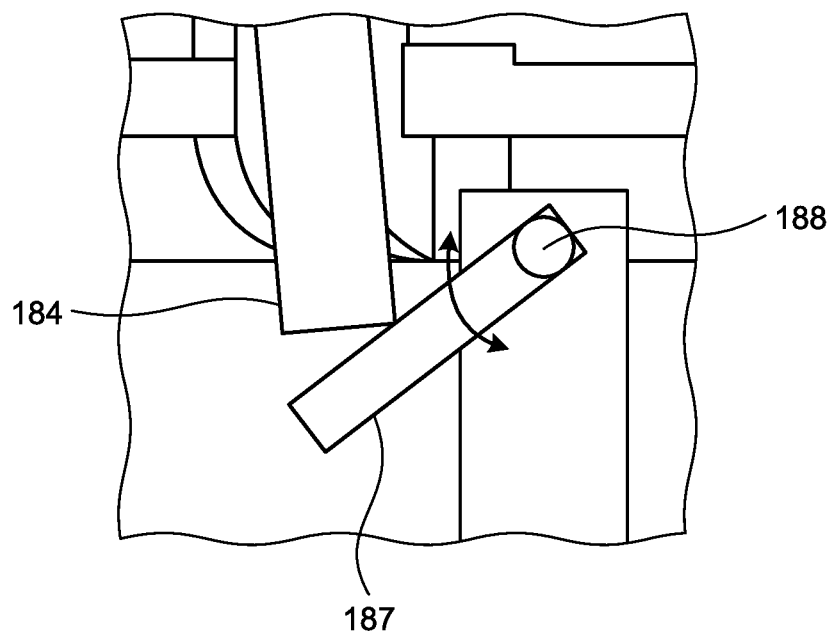
FIG. 32 is a side cross-sectional view of the short split curtain member in the case where a slide member is arranged in a slide member development position.

FIG. 32 is a side cross-sectional view of the short-split-curtain member 187 in the case where the slide member 186 is arranged in the slide member development position. When the slide member 186 is arranged in the slide member development position, the short-split-curtain member 187 separates from the slide member 186 as illustrated in FIG. 32. The short-split-curtain member 187 separates from the slide member 186 and accordingly becomes rotatable counterclockwise in FIG. 32 about the rotation axis 188.

Figure 33:
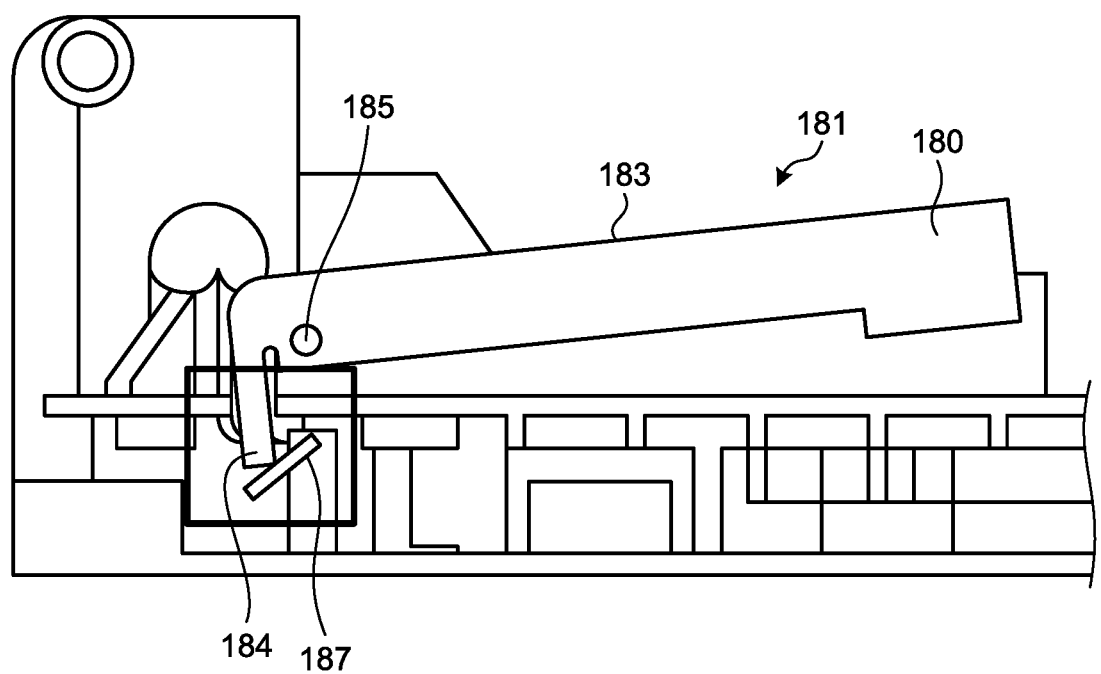
FIG. 33 is a side cross-sectional view of the side guide and the side guide interlock mechanism in the case where the slide member is arranged in the slide member development position.

FIG. 33 is a side cross-sectional view of the side guide 181 and the side guide interlock mechanism 182 in the case where the slide member 186 is arranged in a slide member development position. As illustrated in FIG. 33, the side guide body 183 turns counterclockwise in FIG. 33 because of an elastic force of the spring because the short-split-curtain member 187 becomes rotatable and accordingly the side guide body 183 is arranged in the guide development position.

When the second shooter member 26 moves to the contraction position, the side guide interlock mechanism 182 causes the side guide body 183 to move to the guide storage position. In other words, the second shooter member 26 is arranged in the contraction position and accordingly the slide member 186 is arranged in the slide member storage position. The slide member 186 moves to the slide member storage position and accordingly the short-split-curtain member 187 is pushed up by the slide member 186 to turn about the rotation axis 188 clockwise in FIG. 31. The short-split-curtain member 187 turns and the protrusion 184 is pushed by the short-split-curtain member 187 and accordingly the side guide 181 turns about the rotation axis 185 clockwise in FIG. 33 and is arranged in the guide storage position.

The height of the side guide body 183 with respect to the first shooter placement surface 75 is lower when the side guide 181 is arranged in the guide storage position than when the side guide 181 is arranged in the guide development position. The side guide body 183 is formed to be low so as not to contact the stacker 6 when the first shooter member 25 is arranged in the shooter storage position in the case where the side guide 181 is arranged in the guide storage position.

In the medium conveyance device of the fourth embodiment, as in the case of the medium conveyance device 1 of the first embodiment, it is possible to lower the side guide 181 when the first shooter member 25 is arranged in the storage position. In the medium conveyance device of the fourth embodiment, the side guide 181 is lowered when the first shooter member 25 is arranged in the storage position and thus it is possible to prevent the side guide 181 from contacting the stacker 6, thereby preventing the stacker 6 from being damaged.

Fifth Embodiment

Figure 34:
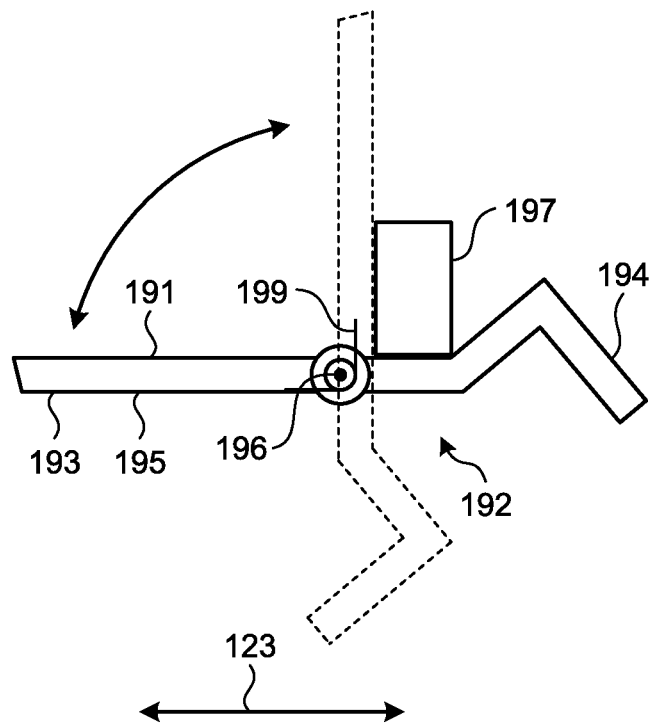
FIG. 34 is a schematic diagram of a side guide and a side guide interlock mechanism of a medium conveyance device of a fifth embodiment.

A medium conveyance device of a fifth embodiment is obtained by replacing the side guide 121 of the medium conveyance device of the fourth embodiment with another side guide and replacing the side guide interlock mechanism 122 with another side guide interlock mechanism. FIG. 34 is a schematic diagram of a side guide 191 and a side guide interlock mechanism 192 of the medium conveyance device of the fifth embodiment. As illustrated in FIG. 34, the side guide 191 includes a side guide body 193 and a sliding part 194. The side guide body 193 is formed into a platy shape and a guide surface 195 is formed in the side guide body 193. The sliding part 194 is is formed into a shape of an inflected plate and is fixed to the side guide body 193.

The side guide 191 is supported on the first shorter member 25 rotatably about a rotation axis 196 to be arranged in a guide storage position or a guide development positon. The rotation axis 196 is parallel with the extension-contraction direction 28. When arranged in the guide storage position, the side guide body 193 is arranged with its guide surface 195 being opposed to the first shooter placement surface 75 of the first shooter member 25. When arranged in the guide development position, the side guide body 193 is arranged with its guide surface 195 being orthogonal to the left-right direction 123.

The side guide interlock mechanism 192 includes a spring 199 and a stopper 197. The spring 199 applies an elastic force to the side guide 191 to cause the side guide 191 to move to the guide development position (turn clockwise in FIG. 34). When the side guide 191 is arranged in the development position, the stopper 197 regulates turn of the side guide 191 such that the side guide 191 does not further turn clockwise in FIG. 34.

Figure 35:
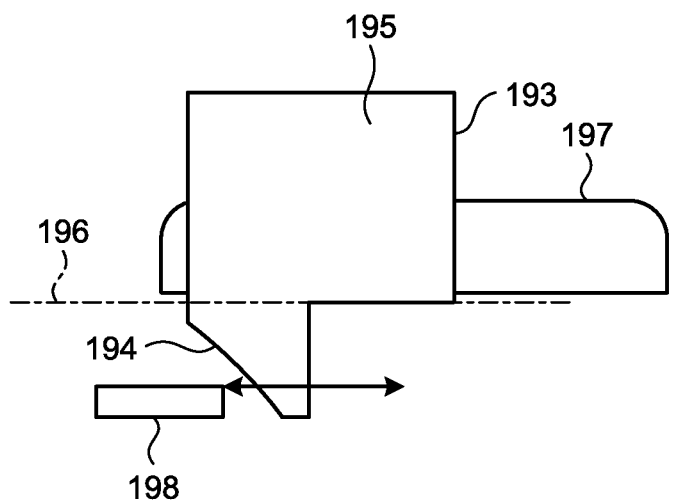
FIG. 35 is a schematic diagram of the side guide and the side guide interlock mechanism during move of the second shooter member from the extension position to the contraction position.

FIG. 35 is a schematic diagram of the side guide 191 and the side guide interlock mechanism 192 during move of the second shooter member 26 from the extension position to the contraction position. The side guide interlock mechanism 192 further includes a slide member 198 as illustrated in FIG. 35. The slide member 198 is arranged in the first shooter member 25 and is fixed to the second shooter member 26. The slide member 198 is formed to contact the sliding part 194 of the side guide 191 during move of the second shooter member 26 from the extension position to the contraction position. After contacting the sliding part 194 of the side guide 191 in the case where the second shooter member 26 moves to the contraction position, the slide member 198 slides on the sliding part 194 to cause the side guide 191 to turn about the rotation axis 196.

Figure 36:
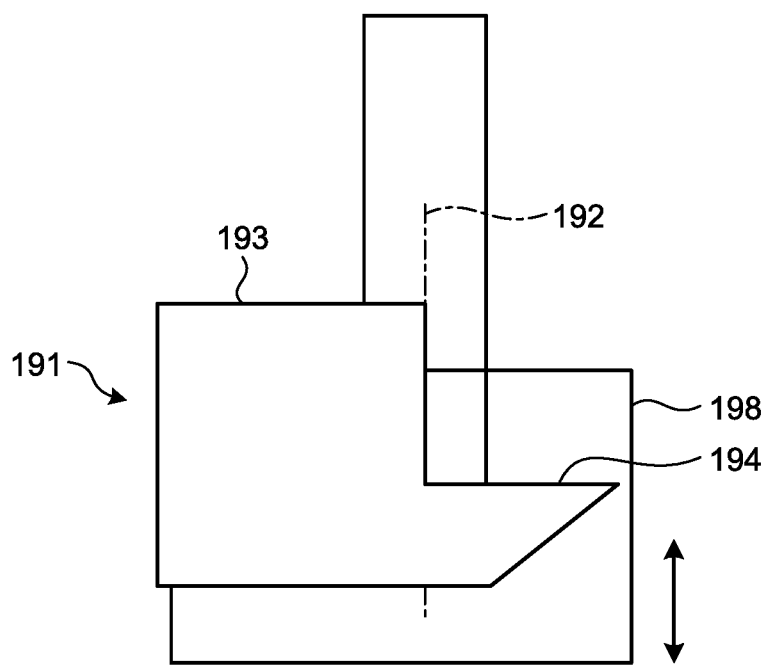
FIG. 36 is a schematic diagram of the side guide and the side guide interlock mechanism with the second shooter member being arranged in the contraction position.

FIG. 36 is a schematic diagram of the side guide 191 and the side guide interlock mechanism 192 in the case where the second shooter member 26 is arranged in the contraction position. When the second shooter member 26 is arranged in the contraction position, as illustrated in FIG. 36, the slide member 198 slides on the sliding part 194 to cause the side guide 191 to turn to be arranged in the guide storage position. The side guide body 193 is formed to enable, even when the first shooter member 25 is arranged in the shooter storage position when the side guide 191 is arranged in the guide storage position, a lowered height of the side guide body 193 with respect to the first shooter placement surface 75 such that the side guide body 193 does not contact the stacker 6.

When the first shooter member 25 moves to the development positon, the side guide interlock mechanism 192 causes the side guide 191 to move to the guide development position. In other words, the first shooter member 25 moves to the development positon and accordingly the second shooter member 26 moves to the extension position. The second shooter member 26 moves to the extension positon and accordingly the slide member 198 slides on the sliding part 194 of the side guide 191 and then separates from the sliding part 194. When the slide member 198 separates from the sliding part 194, the side guide 191 turns about the rotation axis 196 because of the elastic force of the spring 199 and accordingly is arranged in the guide development position.

In the medium conveyance device of the fifth embodiment, as in the case of the medium conveyance device 1 of the first embodiment, it is possible to lower the side guide 191 when the first shooter member 25 is arranged in the storage position. When the first shooter member 25 is arranged in the storage position, the medium conveyance device of the fifth embodiment is able lower the side guide 191 and thus prevents the side guide 191 from contacting the stacker 6, thereby preventing the stacker 6 from being damaged.

Each of the slide member 186 of the medium conveyance device of the fourth embodiment and the slide member 198 of the medium conveyance device of the fifth embodiment is fixed to the second shooter member 26. Alternatively, each of the slide member 186 and the slide member 198 may be replaced with another slide member that is not fixed to the second shooter member 26.

Modification 1 of Slide Member

Figure 37:
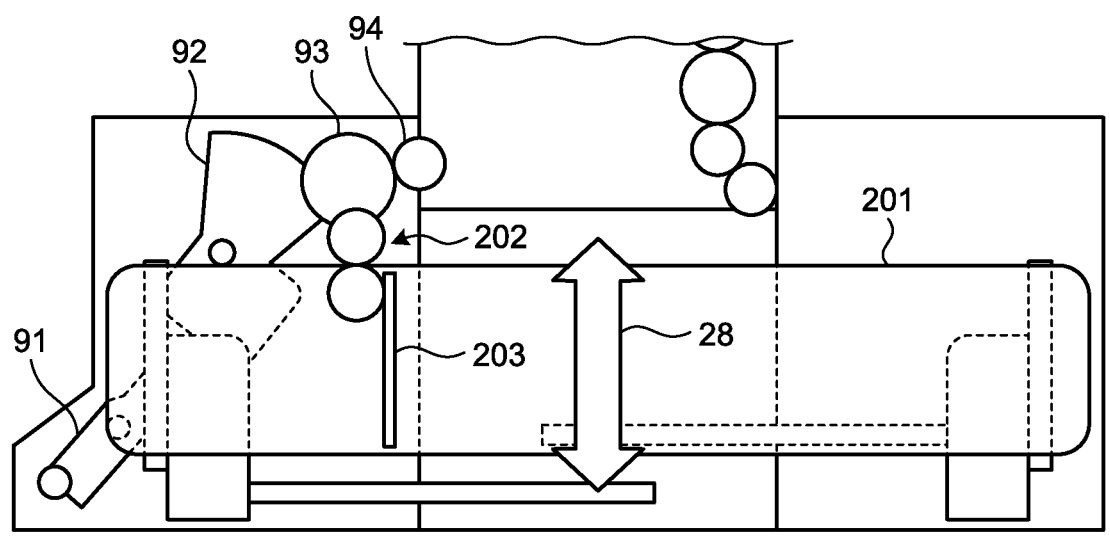
FIG. 37 is a schematic diagram of Modification 1 of the slide member.

FIG. 37 is a schematic diagram of Modification 1 of the slide member. As illustrated in FIG. 37, a slide member 201 of Modification 1 is provided together with a plurality of gears 202 and a rack 203. The slide member 201 is supported on the first shooter member 25 movably in parallel with the extension-contraction direction 28. Each of the gears 202 is formed into a disk shape and a plurality of teeth are formed on the outer circumference of the each of the gears 202. The gears 202 are arranged such the teeth are engaged with each other and the gears are rotatably supported on the first shooter member 25. The teeth of the gears 202 are engaged with each other and thus, when one of the gears 202 rotates, all the gears 202 rotate. One of the gears 202 is engaged with the deceleration gear 93.

The rack 203 is arranged along a straight line parallel with the extension-contraction direction 28 and is fixed to the slide member 201. The rack 203 is engaged with another one of the gears 202. Thus, the slide member 201 moves in parallel with the extension-contraction direction 28 along with turn of the first shooter member 25 about the rotation axis 12.

In the medium conveyance device of the fourth embodiment, even in the case where the slide member 186 is replaced with the slide member 201, it is possible to lower the side guide 181 when the first shooter member 25 is arranged in the storage position, thereby preventing the stacker 6 from being damaged.

In the medium conveyance device of the fifth embodiment, even in the case where the slide member 198 is replaced with the slide member 201, it is possible to lower the side guide 191 when the first shooter member 25 is arranged in the storage position, thereby preventing the stacker 6 from being damaged.

Modification 2 of Slide Member

Figure 38:
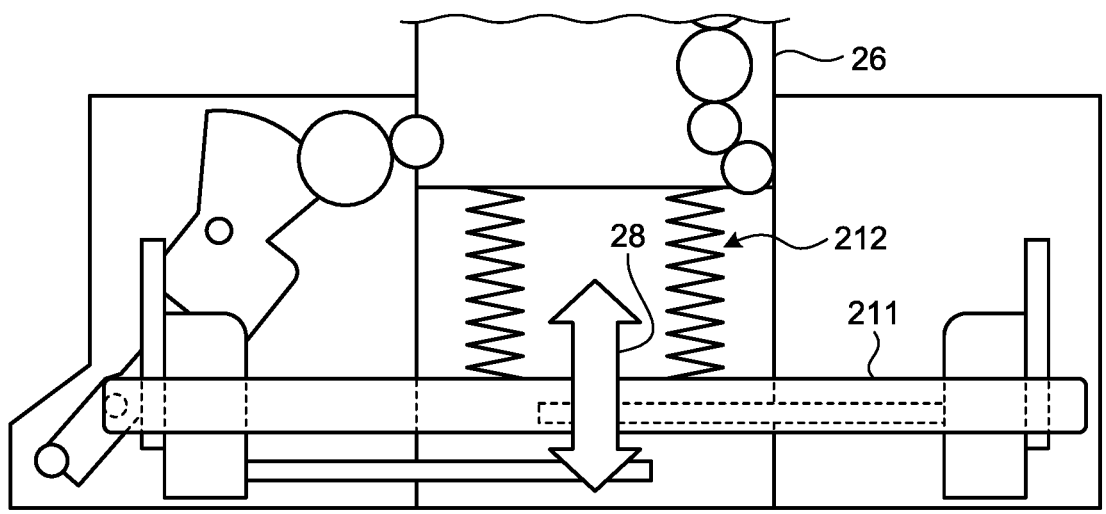
FIG. 38 is a schematic diagram of Modification 2 of the slide member.

FIG. 38 is a schematic diagram of Modification 2 of the slide member. As illustrated in FIG. 38, a slide member 211 of Modification 2 is provided together with a spring 212. The slide member 211 is supported on the first shooter member 25 movably in parallel with the extension-contraction direction 28 to be arranged in a slide member storage position or a slide member development position. One end of the spring 212 is fixed to the slide member 211 and the other end of the spring 212 is fixed to the second shooter member 26. The spring 212 is formed to extend from the natural length when the slide member 211 is arranged in the slide member development position in the case where the second shooter member 26 is arranged in the extension position. The spring 212 is formed further to be compressed from the natural length when the slide member 211 is arranged in the slide member storage position in the case where the second shooter member 26 is arranged in the contraction position. For this reason, the slide member 211 moves in parallel with the extension-contraction direction 28 along with turn of the first shooter member 25 about the rotation axis 12.

In the medium conveyance device of the fifth embodiment, even in the case where the slide member 186 is replaced with the slide member 211, it is possible to lower the side guide 181 when the first shooter member 25 is arranged in the storage position, thereby preventing the stacker 6 from being damaged.

In the medium conveyance device of the fifth embodiment, even in the case where the slide member 198 is replaced with the slide member 211, it is possible to lower the side guide 191 when the first shooter member 25 is arranged in the storage position, thereby preventing the stacker 6 from being damaged.

Modification 3 of Slide Member

Figure 39:
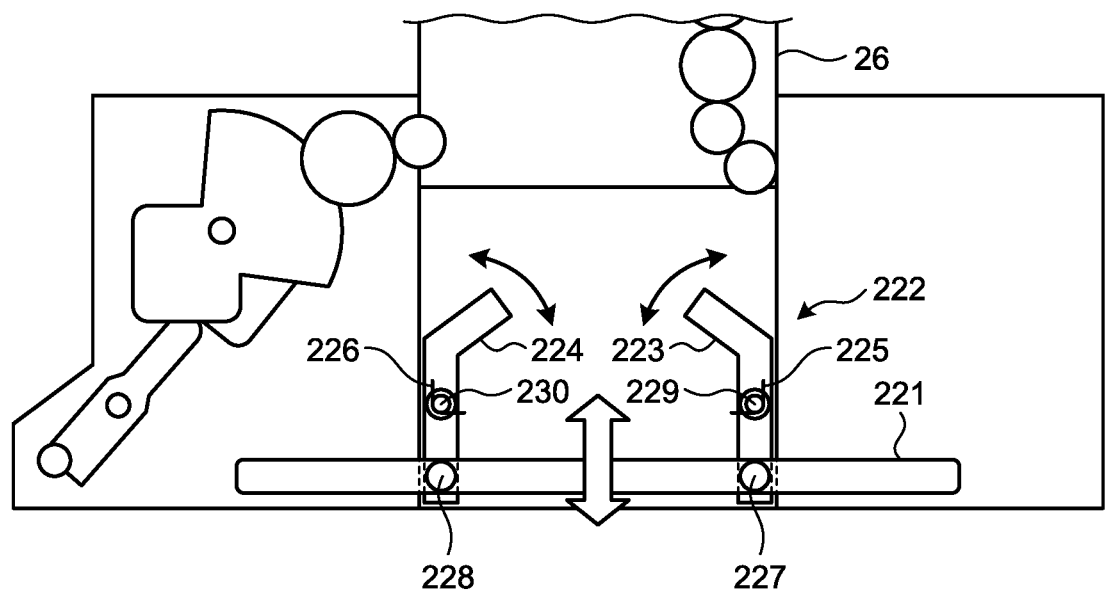
FIG. 39 is a schematic diagram of Modification 3 of the slide member.

FIG. 39 is a schematic diagram of Modification 3 of the slide member. As illustrated in FIG. 39, a slide member 221 of Modification 3 is provided together with an interlock mechanism 222. The slide member 221 is supported on the first shooter member 25 movably in parallel with the extension-contraction direction 28. The interlock mechanism 222 includes a first link 223, a second link 224, a first spring 225, a second spring 226, a first slider 227, and a second slider 228. The first link 223 is formed into a shape of an inflected bar and is supported on the first shooter member 25 rotatably about a rotation axis 229. The second link 224 is formed into a shape of an inflected bar and is supported by the first shooter member 25 rotatably about a rotation axis 230. The first spring 225 applies an elastic force to the first link 223 to cause the first link 223 to turn on the rotation axis 229. The second spring 226 applies an elastic force to the second link 224 to cause the second link 224 to turn on the rotation axis 230. The first slider 227 supports one end of the first link 223 such that the one end of the first link 223 is movable in parallel with the left-right direction 123 along the slide member 221. The second slider 228 supports one end of the second link 224 such that the end of the second link 224 is movable in parallel with the left-right direction 123 along the slide member 221.

When the first shooter member 25 moves between the shooter storage position and the shooter development position, the interlock mechanism 222 causes the slide member 221 to move in parallel with the extension-contraction direction 28. In other words, the first shooter member 25 moves to the shooter storage position and accordingly the second shooter member 26 moves to the contraction position. The second shooter member 26 moves to the contraction positon and accordingly the other end of the first link 223 on the side opposite to the one end where the first slider 227 is provided slides on the second shooter member 26 and the first link 223 turns counterclockwise in FIG. 39 about the rotation axis 229. The second shooter member 26 moves to the contraction direction and accordingly the other end of the second link 224 on the side opposite to the one end where the second slider 228 is provided slides on the second shooter member 26 and the second link 224 turns clockwise in FIG. 39 about the rotation axis 230. The first link 223 turns counterclockwise in FIG. 39 and accordingly the first slider 227 causes the one end of the first link 223 to move along the slide member 221. The second link 224 turns clockwise in FIG. 39 and accordingly the second slider 228 causes the one end of the second link 224 to move along with the slide member 221. The one end of the first link 223 and the one end of the second link 224 move along the slide member 221 and accordingly the slide member 221 moves to be close to the second shooter member 26.

The first shooter member 25 moves to the shooter development position and accordingly the second shooter member 26 moves to the extension position. The second shooter member 26 moves to the extension position and accordingly the other end of the first link 223 on the side opposite to the one end of the first link 223 where the first slider 227 is provided separates from the second shooter member 26. The first link 223 separates from the second shooter member 26 and accordingly the elastic force of the first spring 225 causes the first link 223 to turn clockwise in FIG. 39 about the rotation axis 229. The second shooter member 26 moves to the extension position and accordingly the other end of the second link 224 on the side opposite to the one end of the second link 224 where the second slider 228 is provided separates from the second shooter member 26. The second link 224 separates from the second shooter member 26 and accordingly the elastic force of the second spring 226 causes the second link 224 to turn counterclockwise in FIG. 39 about the rotation axis 230. The first link 223 turns clockwise in FIG. 39 and accordingly the first slider 227 causes the one end of the first link 223 to move along the slide member 221. The second link 224 turns counterclockwise in FIG. 39 and accordingly the second slider 228 causes the one end of the second link 224 to move along the slide member 221. The one end of the first link 223 and the one end of the second link 224 move along the slide member 221 and accordingly the slide member 221 moves to separate from the second shooter member 26.

In the medium conveyance device of the fourth embodiment, even in the case where the slide member 186 is replaced with the slide member 221, when the first shooter member 25 is arranged in the storage position, it is possible to lower the side guide 181, thereby preventing the stacker 6 from being damaged.

In the medium conveyance device of the fifth embodiment, even in the case where the slide member 198 is replaced with the slide member 221, it is possible to lower the side guide 191 when the first shooter member 25 is arranged in the storage position, thereby preventing the stacker 6 from being damaged.

Sixth Embodiment

Figure 40:
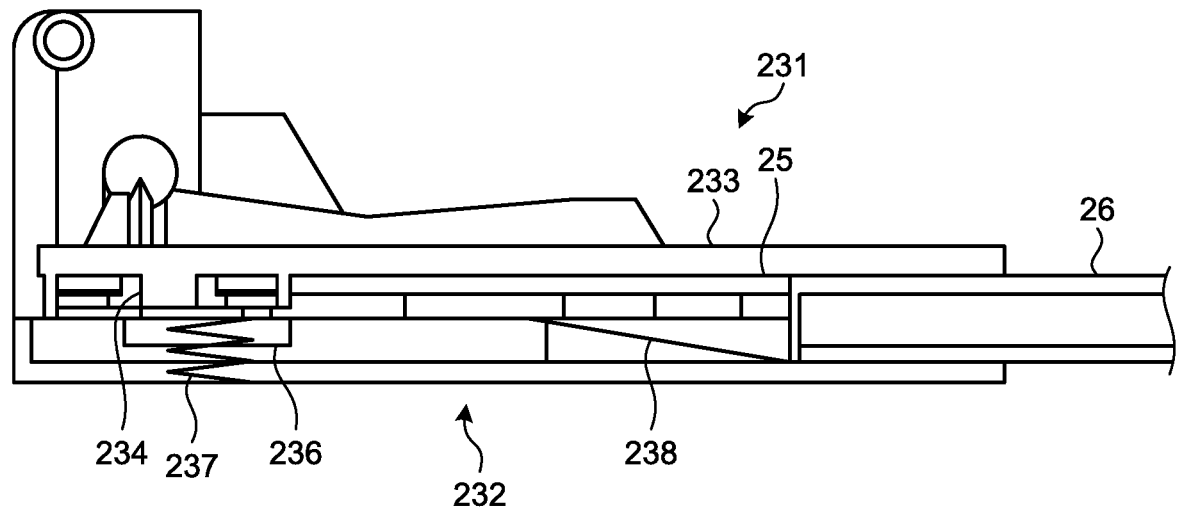
FIG. 40 is a side cross-sectional view of a side guide and a side guide interlock mechanism of a medium conveyance device of a sixth embodiment.

A medium conveyance device of a sixth embodiment is obtained by replacing the side guide 121 of the medium conveyance device 1 of the first embodiment with another side guide and replacing the side guide interlock mechanism 122 with another side guide interlock mechanism. FIG. 40 is a side cross-sectional view of a side guide 231 and a side guide interlock mechanism 232 of the medium conveyance device of the sixth embodiment. As illustrated in FIG. 40, the side guide 231 includes a side guide body 233 and a protrusion 234. The side guide body 233 is formed into a belt shape. The protrusion 234 is arranged in the first shooter member 25 and is fixed to the side guide body 233. The side guide 231 is supported on the first shooter member 25 movably in a direction orthogonal to the first shooter placement surface 75 to be arranged in a guide storage position or a guide development position.

The side guide interlock mechanism 232 includes a slide member 236, a spring 237, and a wedge member 238. The slide member 236 is formed into a platy shape. The slide member 236 is arranged in the first shooter member 25 to contact the protrusion 234 and the slide member 236 is supported on the first shooter member 25 movably in the direction orthogonal to the first shooter placement surface 75. The spring 237 applies an elastic force to the slide member 236 to cause the slide member 236 to push up the protrusion 234. The wedge member 238 is formed into a platy shape, is arranged in the first shooter member 25, and is fixed to the second shooter member 26. The wedge member 238 is formed further to be thinner toward the end of the wedge member 238 on the side distant from the second shooter member 26. The side guide interlock mechanism 232 further includes a spring (not illustrated in FIG. 40). The spring applies an elastic force to the side guide body 233 to lower the height of the side guide body 233 with respect to the first shooter placement surface 75.

The first shooter member 25 is arranged in the shooter storage position and accordingly the side guide interlock mechanism 232 arranges the side guide 231 in the guide storage position. In other words, the first shooter member 25 moves to the shooter storage position and accordingly the second shooter member 26 moves to the contraction position. The second shooter member 26 moves to the contraction position and accordingly the wedge member 238 is inserted into the space between the slide member 236 and the inner wall of the first shooter member 25. The wedge member 238 is inserted into the space between the slide member 236 and the inner wall of the first shooter member 25 and accordingly the slide member 236 separates from the inner wall of the first shooter member 25. When the slide member 236 separates from the inner wall of the first shooter member 25, the protrusion 234 of the side guide 231 is not pushed by the slide member 236. The protrusion 234 is not pushed by the slide member 236 and accordingly the side guide 231 moves because of the elastic force of the spring such that the height of the side guide 231 with respect to the first shooter placement surface 75 lowers.

The first shooter member 25 is arranged in the shooter development position and accordingly the side guide interlock mechanism 232 arranges the side guide 231 in the guide development position. In other words, the first shooter member 25 moves to the shooter development position and accordingly the second shooter member 26 moves to the extension position. The second shooter member 26 moves to the extension position and accordingly the wedge member 238 is caused to come out of the space between the slide member 236 and the inner wall of the first shooter member 25. The wedge member 238 comes out of the space between the slide member 236 and the inner wall of the first shooter member 25 and accordingly the spring 237 applies an elastic force to the slide member 236 to cause the slide member 236 to push the protrusion 234. The elastic force is applied from the spring 237 to the slide member 236 and accordingly the protrusion 234 is pushed up by the slide member 236 and the height of the side guide 231 with respect to the first shooter placement surface 75 increases.

In the medium conveyance device of the sixth embodiment, as in the case of the medium conveyance device 1 of the first embodiment, it is possible to lower the side guide 231 when the first shooter member 25 is arranged in the storage position. In the medium conveyance device of the sixth embodiment, the side guide 231 is lowered when the first shooter member 25 is arranged in the storage position and thus it is possible to prevent the side guide 231 from contacting the stacker 6, thereby preventing the stacker 6 from being damaged.

In the medium conveyance device of the above-described embodiment, the height of the side guide that is provided in the shooter 3 is changed. Alternatively, the height of the side guide that is provided on a table different from the shooter 3 may be changed.

Seventh Embodiment

Figure 41:
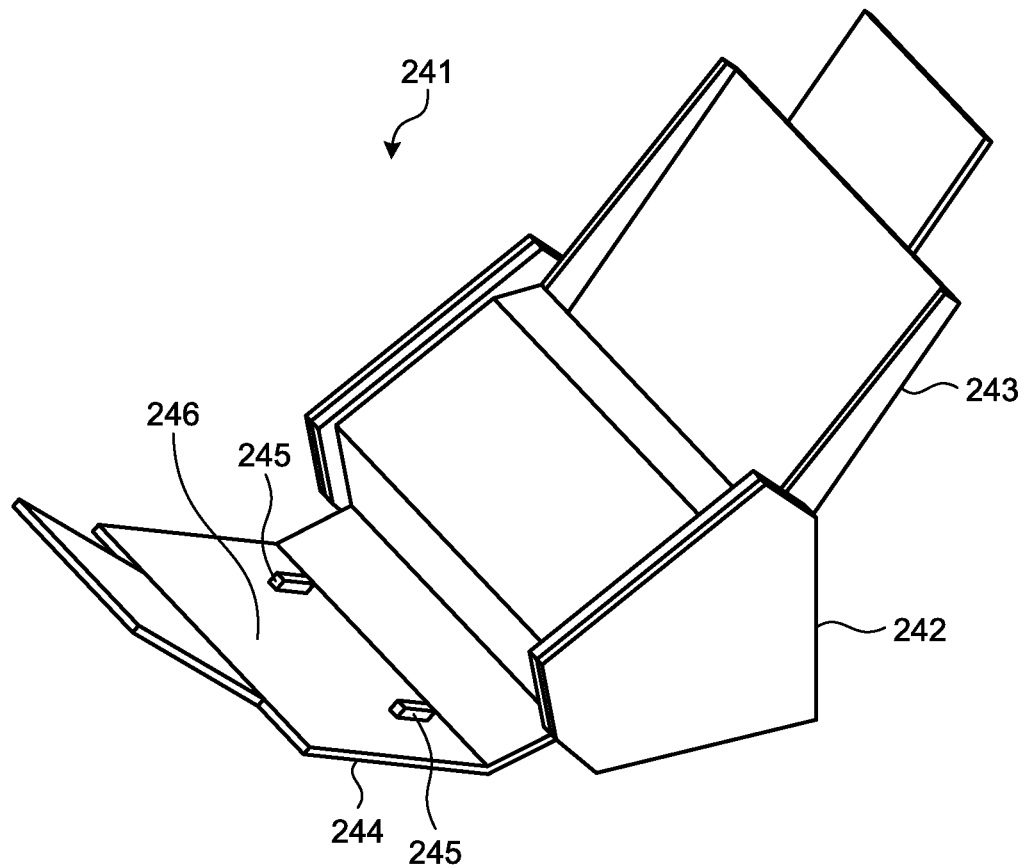
FIG. 41 is a perspective view of a medium conveyance device of a seventh embodiment.

FIG. 41 is a perspective view of a medium conveyance device 241 of a seventh embodiment. As illustrated in FIG. 41, the medium conveyance device 241 includes a body 242, a shooter 243, and a stacker 244. The body 242 picks an original that is placed on the shooter 243, reads the image on the original, and places the original from which the image has been read on the stacker 244. The shooter 243 can be contracted and storable in the upper part of the body 242. The stacker 244 includes a side guide 245. The side guide 245 is arranged to protrude from a stacker placement surface 246 on which originals are placed in the stacker 244.

Figure 42:
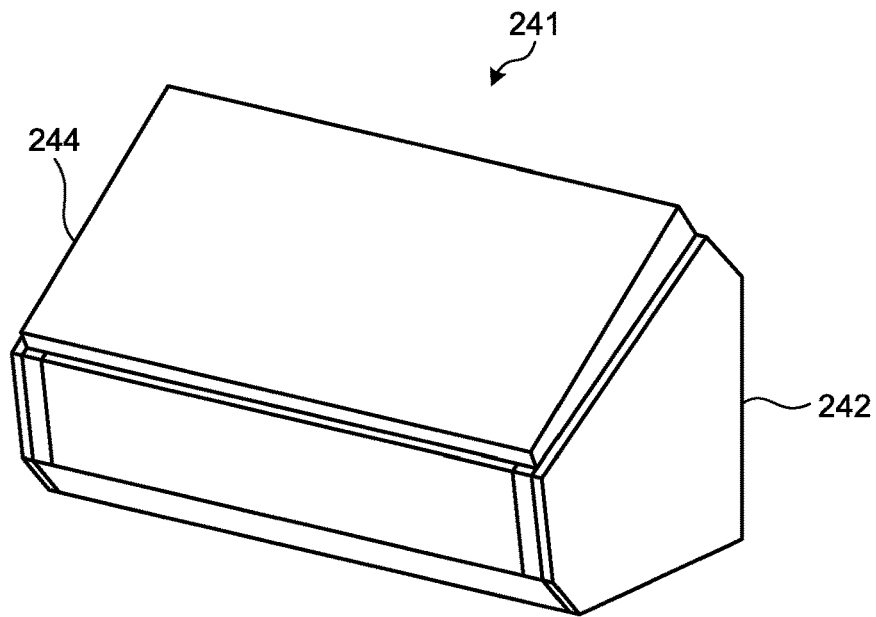
FIG. 42 is a perspective view of the medium conveyance device of a seventh embodiment in the case where a shooter and a stacker are stored.
Figure 43:
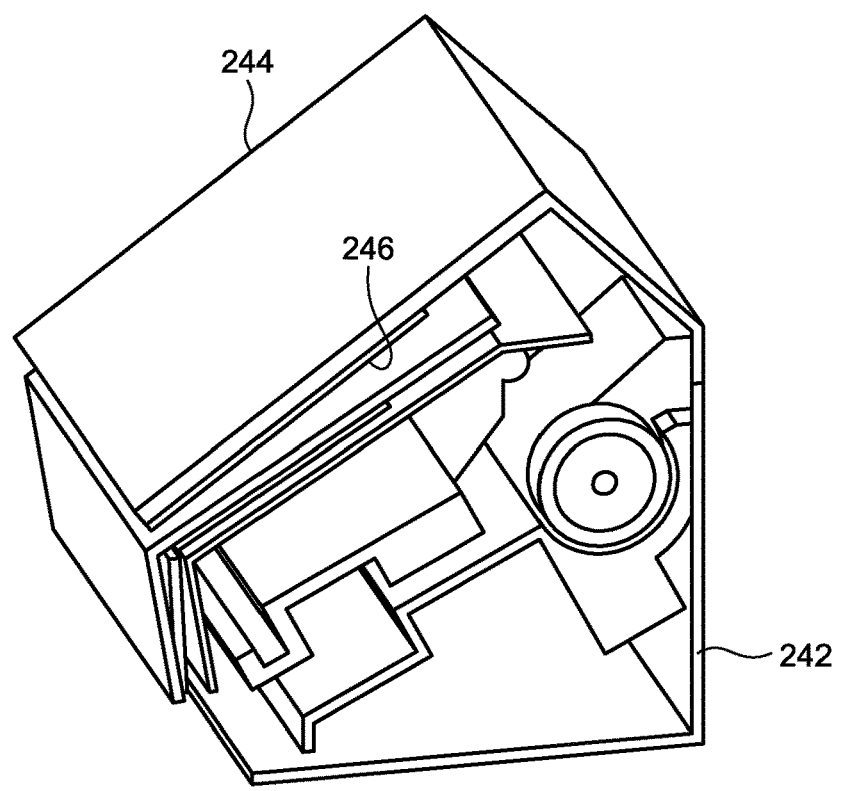
FIG. 43 is a perspective cross-sectional view of the medium conveyance device of the seventh embodiment in the case where the shooter and the stacker are stored.

FIG. 42 is a perspective view of the medium conveyance device 241 of the seventh embodiment in the case where the shooter 243 and the stacker 244 are stored. FIG. 43 is a perspective cross-sectional view of the medium conveyance device 241 of the seventh embodiment in the case where the shooter 243 and the stacker 244 are stored. The stacker 244 is supported on the body 242 rotatably and, as illustrated in FIG. 42, is storable in the upper part of the body 242. When stored in the upper part of the body 242, the stacker 244 is arranged such that the stacker placement surface 246 is opposed to the body 242 as illustrated in FIG. 43. Similarly to the side guide of the medium conveyance device of the above-described embodiment, the side guide 245 is formed such that the height of the side guide 245 lowers when the stacker 244 is stored. The side guide 245 is formed further to lower so as not to contact the body 242 when the stacker 244 is stored in the case where the height of the side guide 245 lowers.

The medium conveyance device 241 of the seventh embodiment is formed such that, when the stacker 244 is stored, the height of the side guide 245 lowers and thus it is possible to prevent the side guide 245 from contacting the body 242, thereby preventing the body 242 from being damaged.

The above-described side guide is used to prevent originals from being conveyed obliquely. Alternatively, the side guide may be used as another guide to regulate move of originals in different ways other than oblique conveyance. A guide to regulate move of originals such that the originals placed on the stacker 6 do not deviate from the stacker 6 is exemplified as such a guide. Similarly to the above-described medium conveyance device, in the medium conveyance device including such a guide, it is possible to prevent the body from being damaged by changing the height of the guide such that the guide does not contact the body.

The above-described medium conveyance device is used as an image read device. Alternatively, the medium conveyance device may be used as another device. A printer is exemplified as the device. When the medium conveyance device is used as a printer, the read device 32 is replaced with a printing device. Even when the medium conveyance device is used as a device that is different from the image read device, by lowering the side guide when the table is arranged in the storage position, it is possible to prevent the side guide from contacting the body, thereby preventing the body from being damaged.

The disclosed medium conveyance device enables prevention of damage.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. A medium conveyance device comprising:
   a body;
   a table in which a placement surface is formed and that is supported by the body movably to be arranged in a first area where the placement surface is oriented upward or to be arranged in a second area where the placement surface is opposed to the body;
   a guide that is supported by the table movably to be arranged in a third area or a fourth area and that regulates movement of an original that is placed on the placement surface such that a height of the guide with respect to the placement surface is lower when the guide is arranged in the fourth area than when the guide is arranged in the third area; and
   a mechanism that causes the guide to move along with movement of the table such that the guide is arranged in the third area when the table is arranged in the first area and the guide is arranged in the fourth area when the table is arranged in the second area, wherein
      the guide is supported on the table rotatably about a rotation axis orthogonal to a direction in which the original is conveyed by the body, and
      a level of a part of the guide on a side more distant from the body than from the rotation axis with respect to the placement surface is higher when the guide is arranged in the third area than when the guide is arranged in the fourth area.

2. The medium conveyance device according to claim 1, wherein the mechanism includes a weight that applies a force of gravity to the guide to cause the guide to move to the fourth area when the table is arranged in the second area.

3. The medium conveyance device according to claim 2, wherein the mechanism further includes an elastic member that applies an elastic force to the guide to cause the guide to move to the third area when the table is arranged in the first area.

4. A medium conveyance device comprising:
   a body;
   a table in which a placement surface is formed and that is supported by the body movably to be arranged in a first area where the placement surface is oriented upward or to be arranged in a second area where the placement surface is opposed to the body;
   a guide that is supported by the table movably to be arranged in a third area or a fourth area and that regulates movement of an original that is placed on the placement surface such that a height of the guide with respect to the placement surface is lower when the guide is arranged in the fourth area than when the guide is arranged in the third area;
   a mechanism that causes the guide to move along with movement of the table such that the guide is arranged in the third area when the table is arranged in the first area and the guide is arranged in the fourth area when the table is arranged in the second area;
   another table on which another placement surface is formed and that is supported on the table movably such that the another placement surface is arranged in a fifth area that is aligned with the placement surface and the another placement surface is arranged in a sixth area that overlaps the placement surface; and
   an intermediate member that is supported on the table movably, wherein the mechanism includes
      a first mechanism that converts a first movement of the table to move with respect to the body between the first area and the second area to a second movement of the intermediate member to move;
      a second mechanism that converts the second movement to third movement of the guide to move between the third area and the fourth area; and
      a third mechanism that coverts the second movement to a fourth movement of the another table to move between the fifth area and the sixth area.

5. A medium conveyance device comprising:
   a body;
   a table in which a placement surface is formed and that is supported by the body movably to be arranged in a first area where the placement surface is oriented upward or to be arranged in a second area where the placement surface is opposed to the body;
   a guide that is supported by the table movably to be arranged in a third area or a fourth area and that regulates movement of an original that is placed on the placement surface such that a height of the guide with respect to the placement surface is lower when the guide is arranged in the fourth area than when the guide is arranged in the third area;
   a mechanism that causes the guide to move along with movement of the table such that the guide is arranged in the third area when the table is arranged in the first area and the guide is arranged in the fourth area when the table is arranged in the second area;
   a first protrusion; and
   a second protrusion, wherein
      the mechanism causes the guide to move along with movement of the table such that the guide bumps against the first protrusion when the table is arranged in the first area and the guide bumps against the second protrusion when the table is arranged in the second area, the guide bumps against the first protrusion and accordingly is arranged in the third area and the guide bumps against the second protrusion and accordingly is arranged in the fourth area, and the mechanism includes a torque limiter that blocks movement of the guide to a side of the first protrusion when the guide bumps against the first protrusion.

* * * * *